United States Patent
Wang et al.

(10) Patent No.: US 11,515,974 B2
(45) Date of Patent: Nov. 29, 2022

(54) COMMUNICATION METHOD AND COMMUNICATIONS APPARATUS

(71) Applicant: HUAWEI TECHNOLOGIES CO., LTD., Guangdong (CN)

(72) Inventors: Ting Wang, Shanghai (CN); Jinlin Peng, Shanghai (CN); Hao Tang, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 17/138,028

(22) Filed: Dec. 30, 2020

(65) Prior Publication Data

US 2021/0119744 A1 Apr. 22, 2021

Related U.S. Application Data

(63) Continuation of application No. PCT/CN2019/095141, filed on Jul. 8, 2019.

(30) Foreign Application Priority Data

Jul. 10, 2018 (CN) .......................... 201810753801.3

(51) Int. Cl.
  *H04W 52/18* (2009.01)
  *H04L 5/00* (2006.01)
  *H04W 72/04* (2009.01)

(52) U.S. Cl.
  CPC ......... *H04L 5/0039* (2013.01); *H04W 72/042* (2013.01); *H04W 72/0453* (2013.01)

(58) Field of Classification Search
  CPC .............. H04L 5/0039; H04W 72/042; H04W 72/0453

(Continued)

(56) References Cited

U.S. PATENT DOCUMENTS 8,897,253 B2 * 11/2014 Shin ...................... H04L 5/0092
  370/329
10,868,649 B2 * 12/2020 Chou .................. H04W 74/006
(Continued)

FOREIGN PATENT DOCUMENTS

CN 102263583 A 11/2011
CN 105898872 A 8/2016
(Continued)

OTHER PUBLICATIONS

MediaTek Inc.,"Summary of Bandwidth Part Remaining Issues",3GPP TSG RAN WG1 Meeting AH 1801, R1-1801067, Vancouver, Canda, Jan. 22-26, 2018, 23 pages.

(Continued)

*Primary Examiner* — Hai V Nguyen
(74) *Attorney, Agent, or Firm* — Fish & Richardson P.C.

(57) ABSTRACT

Example communication methods and a communications apparatus are described. One example method includes receiving first information by a terminal device, where the first information indicates an identifier of a first frequency domain resource, and the first frequency domain resource is contiguous in frequency domain. When a status of the terminal device is a first state, the terminal device with a network device on a second frequency domain resource based on the first information, where the second frequency domain resource includes a plurality of segments of contiguous frequency domain resources, and the first frequency domain resource is one segment of the plurality of segments of contiguous frequency domain resources. According to the foregoing method, the terminal device may communicate, based on the received first information, with the network device on the second frequency domain resource when the status of the terminal device is the first state.

16 Claims, 7 Drawing Sheets

(58) Field of Classification Search
USPC .......................................................... 455/509
See application file for complete search history.

(56) References Cited

U.S. PATENT DOCUMENTS

| | | | |
|---|---|---|---|
| 2013/0176952 A1* | 7/2013 | Shin ..................... | H04L 5/0098 370/329 |
| 2015/0036645 A1* | 2/2015 | Shin ....................... | H04L 5/001 370/329 |
| 2017/0214495 A1* | 7/2017 | Golitschek Edler von Elbwart ... | H04L 1/189 |
| 2018/0139724 A1* | 5/2018 | Loehr ................... | H04W 72/02 |
| 2018/0183551 A1* | 6/2018 | Chou ................... | H04W 72/044 |
| 2019/0182840 A1* | 6/2019 | Feng ................. | H04W 74/0816 |
| 2019/0268090 A1* | 8/2019 | Wang ................. | H04W 72/1268 |
| 2020/0314840 A1* | 10/2020 | Golitschek Edler Von Elbwart ................ | H04L 5/0044 |
| 2021/0243000 A1* | 8/2021 | Choi ..................... | H04L 5/0044 |

FOREIGN PATENT DOCUMENTS

| | | |
|---|---|---|
| CN | 107027188 A | 8/2017 |
| CN | 107734665 A | 2/2018 |
| CN | 108076518 A | 5/2018 |
| WO | 2010087416 A1 | 8/2010 |
| WO | 2018121621 A1 | 7/2018 |

OTHER PUBLICATIONS

Office Action in Chinese Application No. 201810753801.3, dated Jul. 15, 2020, 5 pages.
PCT International Search Report and Written Opinion in International Application No. PCT/CN2019/095141, dated Sep. 27, 2019, 6 pages.
Extended European Search Report issued in European Application No. 19833743.8 dated Jun. 23, 2021, 10 pages.
Huawei, HiSilicon, "Overview of wider bandwidth operations," 3GPP TSG RAN WG1 NR Ad Hoc Meeting, R1-1709972, Qingdao, China, Jun. 27-30, 2017, 9 pages.
Huawei, HiSilicon, "Overview of bandwidth part, CA, and DC operation including SRS switching," 3GPP TSG RAN WG1 Meeting NR#3, R1-1715425, Nagoya, Japan, Sep. 18-21, 2017, 14 pages.
Intel Corporation, "Open issues for wider bandwidth operations," 3GPP TSG RAN WG1 NR Ad-Hoc#2, R1-1710583, Qingdao, P R. China, Jun. 27-30, 2017, 7 pages.
Qualcomm Incorporated, "Wideband and CA Operation for NR," 3GPP TSG-RAN WG4 RAN#85, R4-1712183, Reno, U.S.A, 27 Nov.-Dec. 1, 2017, 3 pages.
Samsung, "Wider Bandwidth Operations," 3GPP TSG RAN WG1 NR Ad-Hoc#2, R1-1710761, Qingdao, P.R. China, Jun. 27-30, 2017, 8 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2019/095141, filed on Jul. 8, 2019, which claims priority to Chinese Patent Application No. 201810753801.3, filed on Jul. 10, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

In a wireless communications system, a terminal device and a network device perform wireless communication based on a radio communications technology. In a 5G new radio (NR) communications system under discussion, maximum bandwidth of one carrier may be 400 MHz, but a maximum bandwidth capability supported by a terminal device may not reach such wide bandwidth. When the terminal device does not support a bandwidth capability of one carrier, a base station cannot directly allocate a frequency domain resource to the terminal device within a range of carrier bandwidth as in a long term evolution (LTE) system, but needs to first configure one or more bandwidth parts (BWP) for the terminal device on the carrier, and then allocates a resource to the terminal device within a range of the BWP.

In the NR system, the base station may configure a plurality of BWPs for the terminal. When data transmission needs to be performed, the base station indicates the terminal device to activate one of the BWPs, so that the base station communicates with the terminal device in the active BWP.

However, an existing BWP is defined as a segment of contiguous frequency domain resources on a given carrier, to be specific, the base station communicate with the terminal device on a segment of contiguous frequency domain resources. Therefore, how to implement communication between the base station and the terminal device on a plurality of segments of contiguous frequency domain resources still needs to be further studied.

SUMMARY

In view of this, embodiments of this application provide a communication method and a communications apparatus, to resolve a technical problem of how to implement communication between a network device and a terminal device on a plurality of segments of contiguous frequency domain resources.

According to a first aspect, an embodiment of this application provides a communication method. The method includes:

A terminal device receives first information, where the first information is used to indicate an identifier of a first frequency domain resource, and the first frequency domain resource is contiguous in frequency domain; and when a status of the terminal device is a first state, the terminal device communicates, based on the first information, with a network device on a second frequency domain resource, where the second frequency domain resource includes a plurality of segments of contiguous frequency domain resources, and the first frequency domain resource is one segment of the plurality of segments of contiguous frequency domain resources.

According to the foregoing method, the terminal device may determine, based on the received first information, to communicate with the network device on the second frequency domain resource when the status of the terminal device is the first state. In an aspect, because the second frequency domain resource includes the plurality of segments of contiguous frequency domain resources, data transmission in a discrete spectrum can be implemented, and use efficiency of the spectrum can be improved. In another aspect, because the first information is used to indicate the identifier of the first frequency domain resource (for example, a BWP), an existing manner of indicating a BWP may be used, implementation is relatively easy, and adaptability is relatively strong.

In a possible design, when the status of the terminal device is a second state, the terminal device communicates with the network device on the first frequency domain resource.

In this way, the status of the terminal device may be flexibly set based on an actual requirement. For example, the status of the terminal device may be the second state, and in this case, the terminal device may communicate with the network device on the first frequency domain resource; or the status of the terminal device may be another possible state. Therefore, through introduction of the status of the terminal device, the network device and the terminal device may adjust, based on an actual situation, a frequency domain resource occupied for communication, to help properly use a spectrum resource.

In a possible design, the first state is a bandwidth part bundle active state, and/or the second state is a bandwidth part active state.

Herein, the bandwidth part bundle active state may also be referred to as a BWP bundle state, or may have another name, and indicates that frequency domain resources that need to be activated are a BWP bundle (noncontiguous frequency domain resources). The bandwidth part active state may also be referred to as a BWP active state, or may have another name, and indicates that frequency domain resources that need to be activated is a BWP (contiguous frequency domain resources).

In a possible design, the method further includes: The terminal device receives second information sent by the network device, where the second information is used to indicate the status of the terminal device.

In this way, the status of the terminal device is configured by the network device and notified to the terminal device. In this manner, the network device may set and continuously update the status of the terminal device based on an actual situation, so that the status of the terminal device is more proper.

In a possible design, the method further includes: The terminal device receives third information, where the third information is used by the terminal device to determine the second frequency domain resource.

Herein, the terminal device may determine the second frequency domain resource by receiving the third information sent by the network device, that is, configure the second frequency domain resource through the network device. The third information may be configuration information, and is used to configure a frequency domain resource for the terminal device. Further, there may be a plurality of frequency domain resource configuration manners, for example, an implicit configuration manner or an explicit configuration manner. For different configuration manners, content included in the third information may be different. The configuration manner and the content included in the third information are not specifically limited in this embodiment of this application. However, any configuration manner in which the terminal device can determine the second frequency domain resource falls within the protection scope of this application.

It should be noted that, in addition to the foregoing manner in which the network device configures the second frequency domain resource for the terminal device, another manner such as predefinition may be further used. This is not limited in this embodiment of this application.

In a possible design, the first frequency domain resource is a bandwidth part (BWP); and the first information includes an identifier of the BWP, or the first information includes an identifier of the BWP and an identifier of a component carrier (CC) on which the BWP is located.

According to a second aspect, an embodiment of this application provides a communication method. The method includes:

A network device sends first information to a terminal device, where the first information is used to indicate an identifier of a first frequency domain resource, and the first frequency domain resource is contiguous in frequency domain; and when a status of the terminal device is a first state, the network device communicates with the terminal device on a second frequency domain resource, where the second frequency domain resource includes a plurality of segments of contiguous frequency domain resources, and the first frequency domain resource is one segment of the plurality of segments of contiguous frequency domain resources.

In a possible design, when the status of the terminal device is a second state, the network device communicates with the terminal device on the first frequency domain resource.

In a possible design, the first state is a bandwidth part bundle active state, and/or the second state is a bandwidth part active state.

In a possible design, the method further includes: The network device sends second information to the terminal device, where the second information is used to indicate the status of the terminal device.

In a possible design, the method further includes: The network device sends third information to the terminal device, where the third information is used by the terminal device to determine the second frequency domain resource.

In a possible design, the first frequency domain resource is a bandwidth part (BWP); and the first information includes an identifier of the BWP, or the first information includes an identifier of the BWP and an identifier of a component carrier (CC) on which the BWP is located.

According to a third aspect, an embodiment of this application provides a communication method. The method includes:

A terminal device receives fourth information, where the fourth information is used to indicate to activate a third frequency domain resource; and the terminal device communicates, based on the fourth information, with a network device on an active frequency domain resource, where the active frequency domain resource includes a plurality of segments of contiguous active frequency domain resources used when the terminal device communicates with the network device, and the third frequency domain resource is one or more segments of the plurality of segments of contiguous active frequency domain resources.

Herein, for example, if the active frequency domain resource includes five segments of contiguous active frequency domain resources, the third frequency domain resource may be the first segment, the second segment, the third segment, the fourth segment, or the fifth segment in the five segments of contiguous active frequency domain resources. If the third frequency domain resource is the five segments of contiguous active frequency domain resources, it indicates that the third frequency domain resource is the active frequency domain resource.

In a possible design, the fourth information is used to indicate to deactivate a fourth frequency domain resource, and the fourth frequency domain resource is a frequency domain resource activated before the fourth information is received; and the method further includes: The terminal device deactivates the fourth frequency domain resource based on the fourth information.

Herein, the fourth information may include an activation field and a deactivation field, and therefore, information carried in the activation field is used to indicate to activate the third frequency domain resource, and information carried in the deactivation field is used to indicate to deactivate the fourth frequency domain resource. The fourth frequency domain resource may be contiguous in frequency domain, or the fourth frequency domain resource includes a plurality of segments of contiguous frequency domain resources. The fourth frequency domain resource may be all frequency domain resources activated before the fourth information is received, or may be some of the frequency domain resources activated before the fourth information is received.

Further, in another possible example, the fourth information may alternatively indicate not to deactivate any frequency domain resource.

In a possible design, the third frequency domain resource is one segment of the plurality of segments of contiguous active frequency domain resources; and the active frequency domain resource further includes a fifth frequency domain resource, and the fifth frequency domain resource is a frequency domain resource activated before the fourth information is received.

In this way, the currently activated third frequency domain resource and the previously activated fifth frequency domain resource may form a BWP bundle, so that the network device and the terminal device may communicate with each other in the BWP bundle, data transmission in a discrete spectrum is implemented, and use efficiency of the spectrum is improved.

According to a fourth aspect, an embodiment of this application provides a communication method. The method includes:

A network device sends fourth information to a terminal device, where the fourth information is used to indicate to activate a third frequency domain resource; and the network device communicates with the terminal device on an active frequency domain resource, where the active frequency domain resource includes a plurality of segments of contiguous active frequency domain resources used when the terminal device communicates with the network device, and the third frequency domain resource is one or more segments of the plurality of segments of contiguous active frequency domain resources.

In a possible design, the fourth information is further used to indicate to deactivate a fourth frequency domain resource, and the fourth frequency domain resource is a frequency domain resource activated before the fourth information is received.

In a possible design, the third frequency domain resource is one segment of the plurality of segments of contiguous active frequency domain resources; and the active frequency domain resource further includes a fifth frequency domain resource, and the fifth frequency domain resource is a frequency domain resource activated before the fourth information is received.

According to a fifth aspect, an embodiment of this application provides an apparatus (which may be a communications apparatus). The apparatus may be a network device or a terminal device, or may be a chip in the network device or a chip in the terminal device. The apparatus has a function of implementing the embodiments of any one of the first aspect, the second aspect, the third aspect, or the fourth aspect. The function may be implemented by hardware, or may be implemented by hardware executing corresponding software. The hardware or the software includes one or more modules corresponding to the function.

According to a sixth aspect, an embodiment of this application provides an apparatus (which may be a communications apparatus). The apparatus includes a processor and a memory; the memory is configured to store a computer-executable instruction; and when the apparatus runs, the processor executes the computer-executable instruction stored in the memory, so that the apparatus performs the communication method according to any one of the first aspect or the possible designs of the first aspect, or the communication method according to any one of the second aspect or the possible designs of the second aspect, or the communication method according to any one of the third aspect or the possible designs of the third aspect, or the communication method according to any one of the fourth aspect or the possible designs of the fourth aspect.

According to a seventh aspect, this application further provides a computer-readable storage medium. The computer-readable storage medium stores an instruction, and when the instruction is run on a computer, the computer is enabled to perform the methods according to the foregoing aspects.

According to an eighth aspect, this application further provides a computer program product including an instruction. When the computer program product is run on a computer, the computer is enabled to perform the methods according to the foregoing aspects.

These aspects or other aspects in this application are clearer and more intelligible in descriptions of the following embodiments.

DETAILED DESCRIPTION OF EMBODIMENTS

To make objectives, technical solutions, and advantages of this application clearer, the following further describes this application in detail with reference to the accompanying drawings. A specific operation method in a method embodiment may also be applied to an apparatus embodiment or a system embodiment. In the description of this application, unless otherwise stated, "a plurality of" means two or more than two.

A communications system architecture and a service scenario described in embodiments of this application are intended to describe the technical solutions in the embodiments of this application more clearly, but constitute no limitation on the technical solutions provided in the embodiments of this application. A person of ordinary skill in the art may learn that the technical solutions provided in the embodiments of this application are also applicable to a similar technical problem as the communications system architecture evolves and a new service scenario emerges.

Figure 1A:
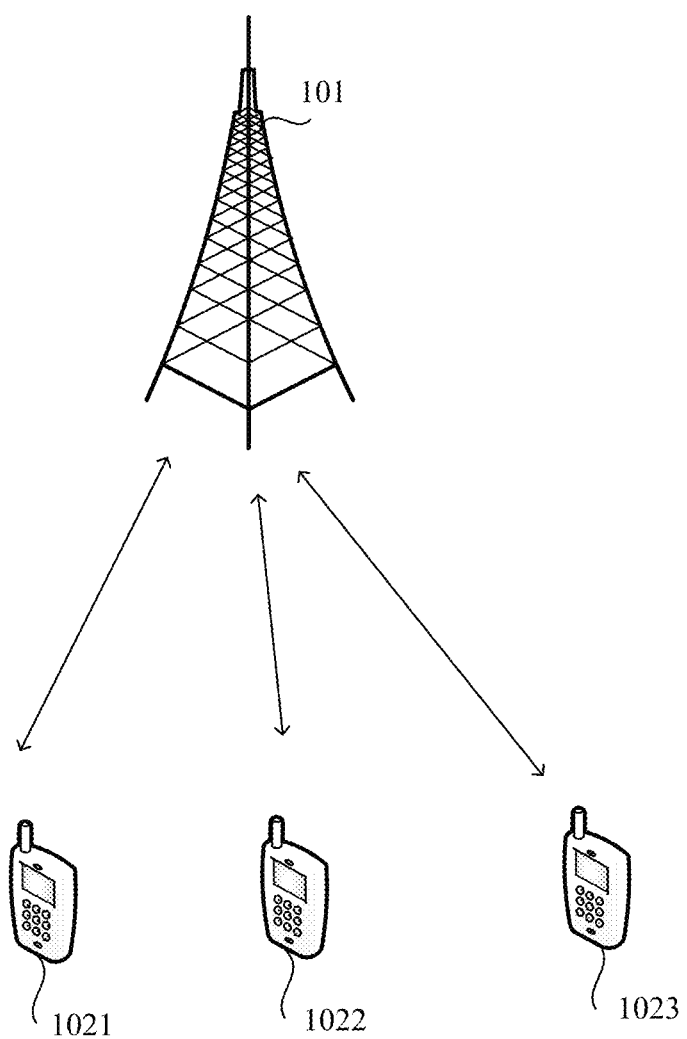
FIG. 1A is a schematic diagram of a system architecture to which an embodiment of this application is applicable.

FIG. 1A is a schematic diagram of a system architecture to which an embodiment of this application is applicable. As shown in FIG. 1A, the system architecture includes a network device 101 and one or more terminal devices, for example, a first terminal 1021, a second terminal 1022, and a third terminal 1023 shown in FIG. 1A. The network device 101 may communicate with any one of the first terminal 1021, the second terminal 1022, and the third terminal 1023 through a network.

In this embodiment of this application, the network device may be a base station (BS), and is an apparatus that is deployed in a radio access network and that is configured to provide a wireless communication function. For example, a device that provides a base station function in a 2G network includes a base transceiver station (BTS) and a base station controller (BSC); a device that provides a base station function in a 3G network includes a NodeB and a radio network controller (RNC); a device that provides a base station function in a 4G network includes an evolved NodeB (eNB); and a device that provides a base station function in a 5G network includes a new radio NodeB (gNB), a central unit (CU), a distributed unit, and a new radio controller.

The terminal device is a device having a wireless transceiver function, and may be deployed on land, where the deployment includes indoor or outdoor, handheld, wearable, or vehicle-mounted deployment, may be deployed on water (for example, on a ship), or may be deployed in air (for example, on an aircraft, a balloon, and a satellite). The terminal device may be a mobile phone, a tablet computer, a computer with a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, and the like. An application scenario is not limited in the embodiments of this application. The terminal device may sometimes be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like.

It should be noted that a communication method provided in the embodiments of this application may be applicable to a plurality of scenarios. For example, the communication method may be applicable to a homogeneous network scenario or a heterogeneous network scenario. For another example, the communication method may be applicable to a low-frequency scenario or a high-frequency scenario.

Further, the communication method provided in the embodiments of this application may alternatively be applicable to coordinated multipoint transmission/reception scenarios between macro base stations, between micro base stations, and between a macro base station and a micro base station. In this case, the network device shown in FIG. 1A may be a general name of one or more transmission points that communicate with the terminal device. The transmission point may be a node that receives a signal and transmits a signal. For example, the transmission point may be a physical node, and is configured with a plurality of antenna units, such as a base station and a micro base station. Different transmission points are geographically separated. The transmission point may alternatively be a cell obtained through sectorization. For example, the terminal device may communicate with two transmission points (for example, a first transmission point and a second transmission point). The first transmission point may be a base station a, the second transmission point may be a base station b, and the base station a and the base station b may be located in a same coordination area. Alternatively, the first transmission point may be a serving cell of the terminal device, the second transmission point may be another cell, the another cell and the serving cell may belong to a same base station, and the another cell may be a neighboring cell of the serving cell.

Figure 1B:
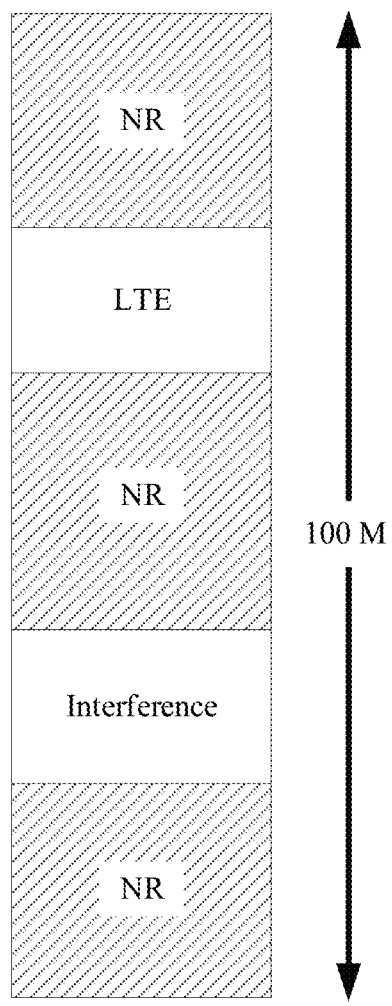
FIG. 1B is a schematic diagram of frequency domain resources occupied for NR data transmission.

Currently, an operator has many discrete spectrums in low frequency bands. For example, an operator A occupies a 1.8 GHz time division duplex (TDD) frequency band, where existing LTE and NR share 7.5 MHz frequency domain resources. 5 MHz frequency domain resources exclusively used by NR may be further newly applied, so that the 7.5 MHz frequency domain resources and the 5 MHz frequency domain resources are combined into frequency domain resources with a bandwidth of 12.5 MHz. However, because an operator B occupies 5 MHz frequency domain resources between the 7.5 MHz frequency domain resources and the 5 MHz frequency domain resources, the 12.5 MHz frequency domain resources are noncontiguous frequency domain resources. For example, as shown in FIG. 1B, a carrier bandwidth of an entire air interface is 100 M, and NR data transmission occupies only frequency domain parts filled with slashes.

To implement data transmission in a discrete spectrum, a BWP bundle is introduced in the embodiments of this application. The BWP bundle may also be referred to as a BWP group or a second-type BWP, or may have another name. This is not specifically limited. The BWP bundle may include a plurality of segments of contiguous frequency domain resources. In other words, the BWP bundle includes noncontiguous frequency domain resources including a plurality of segments of contiguous frequency domain resources. For example, one BWP bundle may include a plurality of segments of frequency domain resources of one component carrier, or may include a plurality of segments of frequency domain resources of a plurality of component carriers. One segment of contiguous frequency domain resources may be referred to as one BWP. For example, the BWP bundle may include a plurality of BWPs, for example, a BWP 0, a BWP 1, and a BWP 2. The BWP bundle may include BWPs on one component carrier (CC), or may include BWPs on a plurality of CCs. The BWP bundle may include only uplink BWPs, or include only downlink BWPs, or include an uplink BWP and a downlink BWP. The uplink BWP is a BWP used for uplink signal transmission, and the downlink BWP is a BWP used for downlink signal transmission.

Optionally, one or more BWP bundles, BWP groups, or second-type BWPs may be configured for one terminal device. When more than one BWP bundle, BWP group, or second-type BWP is configured for one terminal device, the following cases may be included.

(1) More than one BWP bundle, BWP group, or second-type BWP may be configured for a Uu air interface (Universal UE to Network interface) between a network device and a terminal device.

(2) At least one BWP bundle, BWP group, or second-type BWP may be configured for a Uu air interface between a network device and a terminal device, and at least one BWP bundle, BWP group, or second-type BWP may be configured for a sidelink between terminal devices.

(3) More than one BWP bundle, BWP group, or second-type BWP may be configured for a sidelink between terminal devices.

The Uu air interface is used to implement communication between the terminal device and the network device, and the sidelink is used to implement communication between the terminal devices.

Activation and deactivation of a bandwidth part are also referred to as switching of the bandwidth part. An active bandwidth part may be understood as a bandwidth part in which a terminal currently works. The terminal may receive, in an active downlink bandwidth part, a downlink reference signal (including a downlink demodulation reference signal (DMRS) and a channel state information-reference signal (CSI-RS)), a physical downlink control channel (PDCCH), and a physical downlink shared channel (PDSCH), and the terminal may send, in an active uplink bandwidth part, an uplink reference signal (including an uplink DMRS), a physical uplink control channel (PUCCH), and a physical uplink shared channel (PUSCH).

Activation and deactivation of a bandwidth part bundle are also referred to as switching of the bandwidth part bundle. An active bandwidth part bundle may be understood as a bandwidth part bundle in which a terminal currently works. The terminal may receive, in an active downlink bandwidth part bundle, a downlink reference signal (including a downlink demodulation reference signal (DMRS) and a channel state information-reference signal (CSI-RS)), a physical downlink control channel (PDCCH), and a physical downlink shared channel (PDSCH), and the terminal may send, in an active uplink bandwidth part bundle, an uplink reference signal (including an uplink DMRS), a physical uplink control channel (PUCCH), and a physical uplink shared channel (PUSCH).

The following describes the communication method provided in this application with reference to specific embodiments.

Embodiment 1

Figure 2:
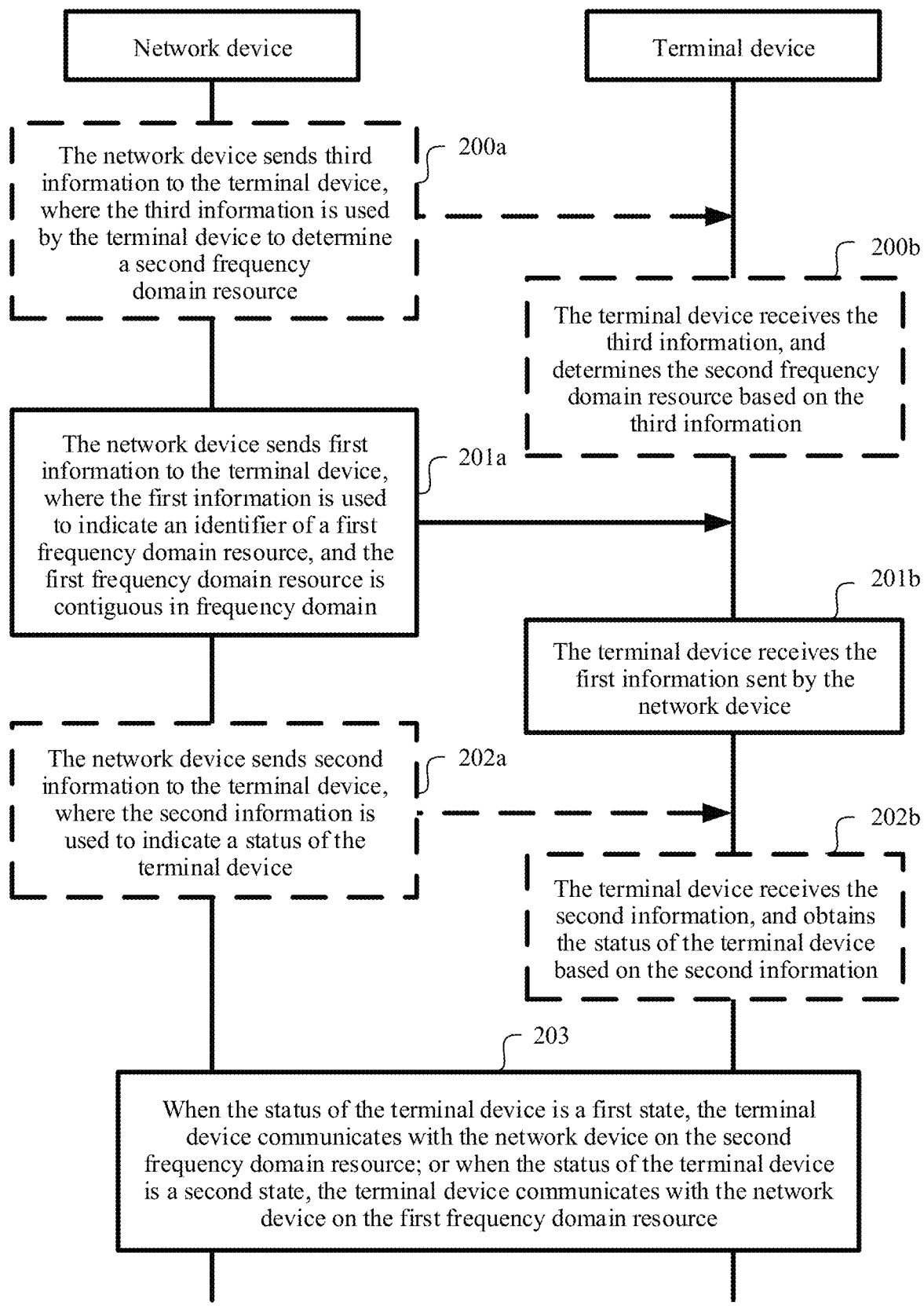
FIG. 2 is a schematic flowchart of a communication method according to Embodiment 1 of this application.

FIG. 2 is a schematic flowchart of a communication method according to Embodiment 1 of this application. As shown in FIG. 2, the method includes the following steps.

Step 201*a*: A network device sends first information to a terminal device, where the first information is used to indicate an identifier of a first frequency domain resource, and the first frequency domain resource is contiguous in frequency domain.

Correspondingly, in step 201*b*, the terminal device receives the first information sent by the network device.

Herein, the network device may send the first information to the terminal in a plurality of implementations. For example, the first information is carried by using signaling (or a message). For example, the network device may send indication information by using radio resource control (RRC) signaling, downlink control information (DCI), or a media access control (MAC) control element (CE).

Step 203: When a status of the terminal device is a first state, the terminal device communicates with the network device on a second frequency domain resource, where the first state may be a bandwidth part bundle active state, namely, a BWP bundle state, or may have another name, and indicates that frequency domain resources that need to be activated are a BWP bundle (noncontiguous frequency domain resources) or indicates that the terminal device can communicate with the network device simultaneously on a plurality of segments of frequency domain resources; or when the status of the terminal device is a second state, the terminal device communicates with the network device on the first frequency domain resource, where the second state may be a bandwidth part active state, namely, a BWP active state, or may have another name, and indicates that frequency domain resources that need to be activated is a BWP (contiguous frequency domain resources) or indicates that the terminal device can communicate with the network device on a segment of contiguous frequency domain resources.

The second frequency domain resource may include a plurality of segments of contiguous frequency domain resources, and the first frequency domain resource may be one segment of the plurality of segments of contiguous frequency domain resources. In other words, the second frequency domain resource may be a BWP bundle, and the first frequency domain resource may be one BWP in the BWP bundle. In an implementation, the second frequency domain resource may be configured by the network device and notified to the terminal device. In this case, the method may further include the following steps. Step 200*a*: The network device sends third information to the terminal device, where the third information is used by the terminal device to determine the second frequency domain resource. Correspondingly, in step 200*b*, the terminal device receives the third information, and determines the second frequency domain resource based on the third information.

The network device may send the third information to the terminal device by using higher layer signaling (for example, RRC signaling). The third information may be configuration information, and is used to configure a frequency domain resource for the terminal device. It may be understood that the third information and the first information may be sent by using a same piece of signaling. For example, the network device sends RRC signaling to the terminal device, where the RRC signaling includes both the third information and the first information. Alternatively, the third information and the first information may be sent by using different signaling.

In an implementation, the network device may configure a frequency domain resource of a BWP bundle by using the third information (configuration information), and the third information may include an identifier of the BWP bundle and a parameter of a BWP included in the BWP bundle.

For example, it may be configured that a BWP bundle 0 includes a BWP 0 and a BWP 1, a BWP bundle 1 includes a BWP 2 and a BWP 3, and a BWP bundle 3 includes a BWP 4, a BWP 5, and a BWP 6. The terminal device may determine, based on the configuration information, the frequency domain resource included in the BWP bundle. In this manner, BWPs included in each BWP bundle are directly indicated. Therefore, this manner may be referred to as an explicit configuration manner.

In this manner, when the status of the terminal device is the first state, if the identifier of the first frequency domain resource is the BWP 0 (or the BWP 1), the terminal device may determine, based on the identifier of the first frequency domain resource, that the second frequency domain resource is the BWP bundle 0; if the identifier of the first frequency domain resource is the BWP 2 (or the BWP 3), the terminal device may determine, based on the identifier of the first frequency domain resource, that the second frequency domain resource is the BWP bundle 1.

Optionally, the third information may include the identifier of the BWP bundle and the frequency domain resource corresponding to the BWP bundle. The terminal device may determine, based on the configuration information, the frequency domain resource included in the BWP bundle. The foregoing method for configuring a frequency domain resource of a BWP bundle is merely an example, and a specific configuration method may alternatively be another manner. This is not limited in this application.

In another implementation, the network device may configure a plurality of BWPs for the terminal device by using the third information (configuration information). In this case, the third information may include parameters of the plurality of BWPs, and the terminal device determines a BWP bundle according to a preset rule. For example, the preset rule may be determined based on the parameter of the BWP. The parameter of the BWP may include at least one of an identifier of the BWP, a subcarrier spacing, a cyclic prefix (CP) length, or an identifier of a CC on which the BWP is located. The identifier of the BWP may be a number of the BWP or other information that identifies the BWP. Likewise, the identifier of the CC may be a number of the CC or other information that identifies the CC. This is not specifically limited. The subcarrier spacing and/or the cyclic prefix length of the BWP may be referred to as a frame structure parameter of the BWP. In other words, the frame structure parameter of the BWP may include the subcarrier spacing and/or the cyclic prefix length. In this manner, BWPs included in each BWP bundle need to be determined according to a rule. Therefore, this manner may be referred to as an implicit configuration manner.

For example, the preset rule may be that BWPs on a same CC form a BWP bundle. For example, the network device configures a BWP 0, a BWP 1, a BWP 2, and a BWP 3 for a CC 0, configures a BWP 4 and a BWP 5 for a CC 1, configures a BWP 6 and a BWP 7 for a CC 2, and configures a BWP 8 for a CC 3. Table 1 shows an example of a plurality of BWPs configured by the network device.

TABLE 1

Example of a plurality of BWPs

| Identifier of a CC | Identifier of a BWP | | | |
|---|---|---|---|---|
| CC 0 | BWP 0 | BWP 1 | BWP 2 | BWP 3 |
| CC 1 | BWP 4 | | BWP 5 | |
| CC 2 | | BWP 6 | BWP 7 | |
| CC 3 | | | | BWP 8 |

BWPs on a same CC form a BWP bundle. Therefore, BWPs in each row in Table 1 may form a BWP bundle, and there are four BWP bundles in total.

It can be learned from the foregoing content that because identifiers (namely, numbers) of the BWPs configured by the network device do not overlap, the identifier of the first frequency domain resource may be an identifier of a BWP. In this case, when the status of the terminal device is the first state, if the identifier of the first frequency domain resource is the BWP 0 (or the BWP 1, the BWP 2, or the BWP 3), the terminal device may determine, based on the identifier of the first frequency domain resource, that the second frequency domain resource is a frequency domain resource including the BWP 0, the BWP 1, the BWP 2, and the BWP 3; if the identifier of the first frequency domain resource is the BWP 4 or the BWP 5, the terminal device may determine, based on the identifier of the first frequency domain resource, that the second frequency domain resource is a frequency domain resource including the BWP 4 and the BWP 5. In addition, when the status of the terminal device is the second state, if the identifier of the first frequency domain resource is the BWP 0, the terminal device may determine, based on the identifier of the first frequency domain resource, that the first frequency domain resource is a frequency domain resource corresponding to the BWP 0; if the identifier of the first frequency domain resource is the BWP 4 or the BWP 5, the terminal device may determine, based on the identifier of the first frequency domain resource, that the first frequency domain resource is a frequency domain resource corresponding to the BWP 4 or the BWP 5.

For another example, the preset rule may be that BWPs having a same identifier form a BWP bundle. For example, the network device configures a BWP 0, a BWP 1, a BWP 2, and a BWP 3 for a CC 0, configures a BWP 0 and a BWP 2 for a CC 1, configures a BWP 1 and a BWP 2 for a CC 2, and configures a BWP 3 for a CC 3. Table 2 shows an example of a plurality of BWPs configured by the network device.

TABLE 2

Example of a plurality of BWPs

| Identifier of a CC | Identifier of a BWP | | | |
|---|---|---|---|---|
| CC 0 | BWP 0 | BWP 1 | BWP 2 | BWP 3 |
| CC 1 | BWP 0 | | BWP 2 | |
| CC 2 | | BWP 1 | BWP 2 | |
| CC 3 | | | | BWP 3 |

BWPs having a same identifier form a BWP bundle. Therefore, BWPs in each column in Table 2 may form a BWP bundle, and there are four BWP bundles in total.

It can be learned from the foregoing content that because identifiers (namely, numbers) of the BWPs configured by the network device overlap, the identifier of the first frequency domain resource may include an identifier of a BWP and an identifier of a CC on which the BWP is located. In this case, when the status of the terminal device is the first state, if the identifier of the first frequency domain resource includes the CC 0 and the BWP 0 (or the CC 1 and the BWP 0), the terminal device may determine, based on the identifier of the first frequency domain resource, that the second frequency domain resource is a BWP bundle including BWPs in the first column; if the identifier of the first frequency domain resource includes the CC 0 and the BWP 1 (or the CC 2 and the BWP 1), the terminal device may determine, based on the identifier of the first frequency domain resource, that the second frequency domain resource is a BWP bundle including BWPs in the second column. In addition, when the status of the terminal device is the second state, if the identifier of the first frequency domain resource includes the CC 0 and the BWP 0, the terminal device may determine, based on the identifier of the first frequency domain resource, that the first frequency domain resource is a frequency domain resource corresponding to the BWP 0 on the CC 0; if the identifier of the first frequency domain resource includes the CC 2 and the BWP 1, the terminal device may determine, based on the identifier of the first frequency domain resource, that the first frequency domain resource is a frequency domain resource corresponding to the BWP 1 on the CC 2.

For another example, the preset rule may be that a BWP bundle is formed based on identifiers of CCs and BWPs that have a same identifier and that are on specified CCs. For example, the network device configures a BWP 0, a BWP 1, a BWP 2, and a BWP 3 for a CC 0, configures a BWP 0 and a BWP 2 for a CC 1, configures a BWP 1 and a BWP 2 for a CC 2, and configures a BWP 1 and a BWP 3 for a CC 3. Table 3 shows an example of a plurality of BWPs configured by the network device.

TABLE 3

Example of a plurality of BWPs

| Identifier of a CC | Identifier of a BWP | | | |
|---|---|---|---|---|
| CC 0 | BWP 0 | BWP 1 | BWP 2 | BWP 3 |
| CC 1 | BWP 0 | | BWP 2 | |
| CC 2 | | BWP 1 | BWP 2 | |
| CC 3 | | BWP 1 | | BWP 3 |

A BWP bundle is formed based on identifiers of CCs and BWPs that have a same identifier and that are on specified CCs, where the specified CCs may be the CC 0 and the CC 1, or the CC 2 and the CC 3. Therefore, in Table 3, the BWP 0 on the CC 0 and the BWP 0 on the CC 1 may form a BWP bundle, the BWP 1 on the CC 2 and the BWP 1 on the CC 3 may form a BWP bundle, and the BWP 2 on the CC 0 and the BWP 2 on the CC 1 may form a BWP bundle. Three BWP bundles may be formed in total.

It can be learned from the foregoing content that because identifiers (namely, numbers) of the BWPs configured by the network device overlap, the identifier of the first frequency domain resource may include an identifier of a BWP and an identifier of a CC on which the BWP is located. In this case, when the status of the terminal device is the first state, if the identifier of the first frequency domain resource includes the CC 0 and the BWP 0 (or the CC 1 and the BWP 0), the terminal device may determine, based on the identifier of the first frequency domain resource, that the second frequency domain resource is a BWP bundle including the BWP 0 on the CC 0 and the BWP 0 on the CC 1; if the identifier of the first frequency domain resource includes the CC 2 and the BWP 1 (or the CC 3 and the BWP 1), the terminal device may determine, based on the identifier of the first frequency domain resource, that the second frequency domain resource is a BWP bundle including the BWP 1 on the CC 2 and the BWP 1 on the CC 3. In addition, when the status of the terminal device is the second state, if the identifier of the first frequency domain resource includes the CC 0 and the BWP 0, the terminal device may determine, based on the identifier of the first frequency domain resource, that the first frequency domain resource is a frequency domain resource corresponding to the BWP 0 on the CC 0; if the identifier of the first frequency domain resource includes the CC 2 and the BWP 1, the terminal device may determine, based on the identifier of the first frequency domain resource, that the first frequency domain resource is a frequency domain resource corresponding to the BWP 1 on the CC 2.

Optionally, when a cell includes a plurality of CCs, different BWPs corresponding to different CCs may form a BWP bundle. The specified CC may be predefined, or may be notified by the network device to the terminal. This is not specifically limited in this embodiment of this application.

For another example, the preset rule may be that BWPs having a same frame structure parameter form a BWP bundle. For example, the network device configures, for a CC 0, a BWP 0 with a subcarrier spacing of 15 kHz, a BWP 1 with a subcarrier spacing of 30 kHz, and a BWP 3 with a subcarrier spacing of 60 kHz; configures, for a CC 1, a BWP 0 with a subcarrier spacing of 15 kHz; configures, for a CC 2, a BWP 1 with a subcarrier spacing of 15 kHz and a BWP 2 with a subcarrier spacing of 30 kHz; and configures, for a CC 3, a BWP 1 with a subcarrier spacing of 15 kHz and a BWP 3 with a subcarrier spacing of 60 kHz. Table 4 shows an example of a plurality of BWPs configured by the network device.

TABLE 4

Example of a plurality of BWPs

| Identifier of a CC | Identifier of a BWP | | | |
|---|---|---|---|---|
| CC 0 | BWP 0 (15k) | BWP 1 (30k) | | BWP 3 (60k) |
| CC 1 | BWP 0 (15k) | | | |
| CC 2 | | BWP 1 (15k) | BWP 2 (30k) | |
| CC 3 | | BWP 1 (15k) | | BWP 3 (60k) |

BWPs having a same frame structure parameter form a BWP bundle. Therefore, in Table 4, the BWP 0 on the CC 0, the BWP 0 on the CC 1, the BWP 1 on the CC 2, and the BWP 1 on the CC 3 may form a BWP bundle, the BWP 1 on the CC 0 and the BWP 2 on the CC 2 may form a BWP bundle, and the BWP 3 on the CC 0 and the BWP 3 on the CC 3 may form a BWP bundle. Three BWP bundles may be formed in total.

It can be learned from the foregoing content that because identifiers (namely, numbers) of the BWPs configured by the network device overlap, the identifier of the first frequency domain resource may include an identifier of a BWP and an identifier of a CC on which the BWP is located. In this case, when the status of the terminal device is the first state, if the identifier of the first frequency domain resource includes the CC 0 and the BWP 0 (or the CC 1 and the BWP 0), the terminal device may determine, based on the identifier of the first frequency domain resource, that the second frequency domain resource is a BWP bundle including the BWP 0 on the CC 0 and the BWP 0 on the CC 1; if the identifier of the first frequency domain resource includes the CC 2 and the BWP 1 (or the CC 3 and the BWP 1), the terminal device may determine, based on the identifier of the first frequency domain resource, that the second frequency domain resource is a BWP bundle including the BWP 1 on the CC 2 and the BWP 1 on the CC 3. In addition, when the status of the terminal device is the second state, if the identifier of the first frequency domain resource includes the CC 0 and the BWP 0, the terminal device may determine, based on the identifier of the first frequency domain resource, that the first frequency domain resource is a frequency domain resource corresponding to the BWP 0 on the CC 0; if the identifier of the first frequency domain resource includes the CC 2 and the BWP 1, the terminal device may determine, based on the identifier of the first frequency domain resource, that the first frequency domain resource is a frequency domain resource corresponding to the BWP 1 on the CC 2.

Optionally, a BWP bundle may be indicated by indicating a smallest BWP ID of BWPs included in the BWP bundle. This is not specifically limited in this embodiment of this application. For example, when the terminal device is in the first state, if the BWP 0 is indicated, in other words, if the identifier of the first frequency domain resource is the BWP 0, the terminal device may determine, based on the identifier of the first frequency domain resource, that the second frequency domain resource is a BWP bundle including the BWP 0 on the CC 0, the BWP 0 on the CC 1, the BWP 1 on the CC 2, and the BWP 1 on the CC 3; if the BWP 1 is indicated, in other words, if the identifier of the first frequency domain resource is the BWP 1, the terminal device may determine, based on the identifier of the first frequency domain resource, that the second frequency domain resource is a BWP bundle including the BWP 1 on the CC 0 and the BWP 2 on the CC 2; if the BWP 3 is indicated, in other words, if the identifier of the first frequency domain resource is the BWP 3, the terminal device may determine, based on the identifier of the first frequency domain resource, that the second frequency domain resource is a BWP bundle including the BWP 3 on the CC 0 and the BWP 3 on the CC 3.

Optionally, a BWP bundle may be indicated by indicating a frame structure parameter of a BWP included in the BWP bundle. For example, when the terminal device is in the first state, if the subcarrier spacing of 15 kHz is indicated, in other words, if the identifier of the first frequency domain resource is the subcarrier spacing of 15 kHz, the terminal device may determine, based on the identifier of the first frequency domain resource, that the second frequency domain resource is a BWP bundle including the BWP 0 on the CC 0, the BWP 0 on the CC 1, the BWP 1 on the CC 2, and the BWP 1 on the CC 3; if the subcarrier spacing of 30 kHz is indicated, in other words, if the identifier of the first frequency domain resource is the subcarrier spacing of 30 kHz, the terminal device may determine, based on the identifier of the first frequency domain resource, that the second frequency domain resource is a BWP bundle including the BWP 1 on the CC 0 and the BWP 2 on the CC 2; if the subcarrier spacing of 60 kHz is indicated, in other words, if the identifier of the first frequency domain resource is the subcarrier spacing of 60 kHz, the terminal device may determine, based on the identifier of the first frequency domain resource, that the second frequency domain resource is a BWP bundle including the BWP 3 on the CC 0 and the BWP 3 on the CC 3.

A specific manner of indicating a BWP bundle is not limited in this embodiment of this application.

For another example, the preset rule is that a BWP bundle is formed based on identifiers of CCs and BWPs that have a same frame structure parameter and that are on specified CCs. For example, the network device configures, for a CC 0, a BWP 0 with a subcarrier spacing of 15 kHz, a BWP 1 with a subcarrier spacing of 30 kHz, and a BWP 3 with a subcarrier spacing of 60 kHz; configures, for a CC 1, a BWP 0 with a subcarrier spacing of 15 kHz; configures, for a CC 2, a BWP 1 with a subcarrier spacing of 15 kHz and a BWP 2 with a subcarrier spacing of 30 kHz; and configures, for a CC 3, a BWP 1 with a subcarrier spacing of 15 kHz and a BWP 3 with a subcarrier spacing of 60 kHz. Table 5 shows an example of a plurality of BWPs configured by the network device.

TABLE 5

Example of a plurality of BWPs

| Identifier of a CC | Identifier of a BWP | | |
|---|---|---|---|
| CC 0 | BWP 0 (15k) | BWP 1 (30k) | BWP 3 (60k) |
| CC 1 | BWP 0 (15k) | | |
| CC 2 | | BWP 1 (15k) | BWP 2 (30k) |
| CC 3 | | BWP 1 (15k) | BWP 3 (60k) |

A BWP bundle is formed based on identifiers of CCs and BWPs that have a same frame structure parameter and that are on specified CCs, where the specified CCs may be the CC 0 and the CC 1, or the CC 2 and the CC 3. Therefore, in Table 5, the BWP 0 on the CC 0 and the BWP 0 on the CC 1 may form a BWP bundle, and the BWP 1 on the CC 2 and the BWP 1 on the CC 3 may form a BWP bundle. Two BWP bundles may be formed in total.

It can be learned from the foregoing content that because identifiers (namely, numbers) of the BWPs configured by the network device overlap, the identifier of the first frequency domain resource may include an identifier of a BWP and an identifier of a CC on which the BWP is located. In this case, when the status of the terminal device is the first state, if the identifier of the first frequency domain resource includes the CC 0 and the BWP 0 (or the CC 1 and the BWP 0), the terminal device may determine, based on the identifier of the first frequency domain resource, that the second frequency domain resource is a BWP bundle including the BWP 0 on the CC 0 and the BWP 0 on the CC 1; if the identifier of the first frequency domain resource includes the CC 2 and the BWP 1 (or the CC 3 and the BWP 1), the terminal device may determine, based on the identifier of the first frequency domain resource, that the second frequency domain resource is a BWP bundle including the BWP 1 on the CC 2 and the BWP 1 on the CC 3. In addition, when the status of the terminal device is the second state, if the identifier of the first frequency domain resource includes the CC 0 and the BWP 0, the terminal device may determine, based on the identifier of the first frequency domain resource, that the first frequency domain resource is a frequency domain resource corresponding to the BWP 0 on the CC 0; if the identifier of the first frequency domain resource includes the CC 2 and the BWP 1, the terminal device may determine, based on the identifier of the first frequency domain resource, that the first frequency domain resource is a frequency domain resource corresponding to the BWP 1 on the CC 2.

For another example, the preset rule is that BWPs that have a same frame structure parameter and that have a same identifier form a BWP bundle. For example, the network device configures, for a CC 0, a BWP 0 with a subcarrier spacing of 15 kHz, a BWP 1 with a subcarrier spacing of 30 kHz, and a BWP 3 with a subcarrier spacing of 60 kHz; configures, for a CC 1, a BWP 0 with a subcarrier spacing of 15 kHz; configures, for a CC 2, a BWP 1 with a subcarrier spacing of 15 kHz and a BWP 2 with a subcarrier spacing of 30 kHz; and configures, for a CC 3, a BWP 1 with a subcarrier spacing of 15 kHz and a BWP 3 with a subcarrier spacing of 60 kHz. Table 6 shows an example of a plurality of BWPs configured by the network device.

TABLE 6

Example of a plurality of BWPs

| Identifier of a CC | Identifier of a BWP | | |
|---|---|---|---|
| CC 0 | BWP 0 (15k) | BWP 1 (30k) | BWP 3 (60k) |
| CC 1 | BWP 0 (15k) | | |
| CC 2 | | BWP 1 (15k) | BWP 2 (30k) |
| CC 3 | | BWP 1 (15k) | BWP 3 (60k) |

BWPs that have a same frame structure parameter and that have a same identifier form a BWP bundle. Therefore, in Table 6, the BWP 0 on the CC 0 and the BWP 0 on the CC 1 may form a BWP bundle, the BWP 1 on the CC 2 and the BWP 1 on the CC 3 may form a BWP bundle, and the BWP 3 on the CC 0 and the BWP 3 on the CC 3 may form a BWP bundle. Three BWP bundles may be formed in total.

It can be learned from the foregoing content that because identifiers (namely, numbers) of the BWPs configured by the network device overlap, the identifier of the first frequency domain resource may include an identifier of a BWP and an identifier of a CC on which the BWP is located. In this case, when the status of the terminal device is the first state, if the identifier of the first frequency domain resource includes the CC 0 and the BWP 0 (or the CC 1 and the BWP 0), the terminal device may determine, based on the identifier of the first frequency domain resource, that the second frequency domain resource is a BWP bundle including the BWP 0 on the CC 0 and the BWP 0 on the CC 1; if the identifier of the first frequency domain resource includes the CC 2 and the BWP 1 (or the CC 3 and the BWP 1), the terminal device may determine, based on the identifier of the first frequency domain resource, that the second frequency domain resource is a BWP bundle including the BWP 1 on the CC 2 and the BWP 1 on the CC 3; if the identifier of the first frequency domain resource includes the CC 0 and the BWP 3 (or the CC 3 and the BWP 3), the terminal device may determine, based on the identifier of the first frequency domain resource, that the second frequency domain resource is a BWP bundle including the BWP 3 on the CC 0 and the BWP 3 on the CC 3. In addition, when the status of the terminal device is the second state, if the identifier of the first frequency domain resource includes the CC 0 and the BWP 0, the terminal device may determine, based on the identifier of the first frequency domain resource, that the first frequency domain resource is a frequency domain resource corresponding to the BWP 0 on the CC 0; if the identifier of the first frequency domain resource includes the CC 2 and the BWP 1, the terminal device may determine, based on the identifier of the first frequency domain resource, that the first frequency domain resource is a frequency domain resource corresponding to the BWP 1 on the CC 2; if the identifier of the first frequency domain resource includes the CC 3 and the BWP 3, the terminal device may determine, based on the identifier of the first frequency domain resource, that the first frequency domain resource is a frequency domain resource corresponding to the BWP 3 on the CC 3.

For another example, the preset rule is that a BWP bundle is formed based on identifiers of CCs and BWPs that have a same frame structure parameter, that have a same identifier, and that are on specified CCs. For example, the network device configures, for a CC 0, a BWP 0 with a subcarrier spacing of 15 kHz, a BWP 1 with a subcarrier spacing of 30 kHz, and a BWP 3 with a subcarrier spacing of 60 kHz; configures, for a CC 1, a BWP 0 with a subcarrier spacing of 15 kHz; configures, for a CC 2, a BWP 1 with a subcarrier spacing of 15 kHz and a BWP 2 with a subcarrier spacing of 30 kHz; and configures, for a CC 3, a BWP 1 with a subcarrier spacing of 15 kHz and a BWP 3 with a subcarrier spacing of 60 kHz. Table 7 shows an example of a plurality of BWPs configured by the network device.

TABLE 7

Example of a plurality of BWPs

| Identifier of a CC | Identifier of a BWP | | |
|---|---|---|---|
| CC 0 | BWP 0 (15k) | BWP 1 (30k) | BWP 3 (60k) |
| CC 1 | BWP 0 (15k) | | |
| CC 2 | | BWP 1 (15k) | BWP 2 (30k) |
| CC 3 | | BWP 1 (15k) | BWP 3 (60k) |

A BWP bundle is formed based on identifiers of CCs and BWPs that have a same frame structure parameter, that have a same identifier, and that are on specified CCs, where the specified CCs may be the CC 0 and the CC 1, or the CC 2 and the CC 3. Therefore, in Table 7, the BWP 0 on the CC 0 and the BWP 0 on the CC 1 may form a BWP bundle, and the BWP 1 on the CC 2 and the BWP 1 on the CC 3 may form a BWP bundle. Two BWP bundles may be formed in total.

It can be learned from the foregoing content that because identifiers (namely, numbers) of the BWPs configured by the network device overlap, the identifier of the first frequency domain resource may include an identifier of a BWP and an identifier of a CC on which the BWP is located. In this case, when the status of the terminal device is the first state, if the identifier of the first frequency domain resource includes the CC 0 and the BWP 0 (or the CC 1 and the BWP 0), the terminal device may determine, based on the identifier of the first frequency domain resource, that the second frequency domain resource is a BWP bundle including the BWP 0 on the CC 0 and the BWP 0 on the CC 1; if the identifier of the first frequency domain resource includes the CC 2 and the BWP 1 (or the CC 3 and the BWP 1), the terminal device may determine, based on the identifier of the first frequency domain resource, that the second frequency domain resource is a BWP bundle including the BWP 1 on the CC 2 and the BWP 1 on the CC 3. In addition, when the status of the terminal device is the second state, if the identifier of the first frequency domain resource includes the CC 0 and the BWP 0, the terminal device may determine, based on the identifier of the first frequency domain resource, that the first frequency domain resource is a frequency domain resource corresponding to the BWP 0 on the CC 0; if the identifier of the first frequency domain resource includes the CC 2 and the BWP 1, the terminal device may determine, based on the identifier of the first frequency domain resource, that the first frequency domain resource is a frequency domain resource corresponding to the BWP 1 on the CC 2.

It can be learned from the foregoing content that a manner of configuring a frequency domain resource by the network device may be the explicit configuration manner, the implicit configuration manner, or another possible manner, provided that the terminal device can determine the second frequency domain resource based on the identifier of the first frequency domain resource when the status of the terminal device is the first state. A specific configuration manner is not limited in this embodiment of this application.

It should be noted that after the network device configures the frequency domain resource (for example, a plurality of BWPs) for the terminal device by using the configuration information, the configured frequency domain resource may be in an inactive state. When the status of the terminal device is the first state, after determining the second frequency domain resource, the terminal device may activate the second frequency domain resource, and communicate with the network device on the second frequency domain resource. If the second frequency domain resource includes frequency domain resources on a plurality of CCs, data sending or receiving may be implemented on the plurality of CCs when the network device and the terminal device perform data transmission on the second frequency domain resource. When the status of the terminal device is the second state, the terminal device may activate the first frequency domain resource directly based on the identifier of the first frequency domain resource, and communicate with the network device on the first frequency domain resource.

Optionally, signaling (which may be referred to as configuration signaling) carrying the third information and signaling (which may be referred to as activation signaling) carrying the first information may be carried on a same information element or a same field of a message, that is, configuration indicates activation.

Optionally, the configuration signaling and the activation signaling may be carried on different information elements or different fields of a message, and may be sent by using one message, or may be sent by using a plurality of messages.

The status of the terminal device may be predetermined in a protocol, or may be configured by the network device and notified to the terminal device. This is not specifically limited.

If the status of the terminal device is configured by the network device and notified to the terminal device, the method may further include the following steps. Step 202a: The network device sends second information to the terminal device, where the second information is used to indicate the status of the terminal device. Correspondingly, in step 202b, the terminal device receives the second information, and obtains the status of the terminal device based on the second information.

The second information may indicate the status of the terminal device in a plurality of manners. For example, if the status of the terminal device includes the first state and the second state, one bit may be used for indication, where 0 indicates the first state, and 1 indicates the second state; or 1 indicates the first state, and 0 indicates the second state. It may be understood that, if the status of the terminal device includes more than two statuses, a plurality of bits may be used for indication.

For another example, if the status of the terminal device includes a bandwidth part bundle active manner and a bandwidth part active manner, the network device may indicate, by using the second information, whether the terminal device is in the bandwidth part bundle active manner, and the terminal device determines the status of the terminal device based on the second information; or the network device may indicate, by using the second information, whether the terminal device is in the bandwidth part active manner, and the terminal device determines the status of the terminal device based on the second information.

For example, the network device may configure, by using the second information, information about "on/off" (for example, "BWP bundle on/off") or "true/false" (for example, "BWP bundle true/false") for BWP bundle activation, or the network device may configure, by using the second information, whether the bandwidth part bundle active manner is enabled or disabled. For example, "BWP bundle on" indicates that the status of the terminal device is the first state or the bandwidth part bundle active manner, or that the bandwidth part bundle active manner is enabled. Correspondingly, "BWP bundle off" indicates that the status of the terminal device is the second state or the bandwidth part active manner, or that the bandwidth part bundle active manner is disabled. Alternatively, "BWP bundle true" indicates that the status of the terminal device is the first state or the bandwidth part bundle active manner, or that the bandwidth part bundle active manner is enabled. Correspondingly, "BWP bundle false" indicates that the status of the terminal device is the second state or the bandwidth part active manner, or that the bandwidth part bundle active manner is disabled.

The following provides description with reference to specific examples.

Example 1: The network device configures a BWP 0, a BWP 1, a BWP 2, and a BWP 3 for a CC 0, configures a BWP 0 and a BWP 2 for a CC 1, configures a BWP 1 and a BWP 2 for a CC 2, and configures a BWP 3 for a CC 3.

The following uses an example in which BWPs having a same identifier form a BWP bundle. Table 8 shows an example of a plurality of BWPs configured by the network device.

TABLE 8

Example of a plurality of BWPs

| Identifier of a CC | Identifier of a BWP | | | |
|---|---|---|---|---|
| CC 0 | BWP 0 | BWP 1 | BWP 2 | BWP 3 |
| CC 1 | BWP 0 | | BWP 2 | |
| CC 2 | | BWP 1 | BWP 2 | |
| CC 3 | | | | BWP 3 |

In a case, the first information includes the identifier of the first frequency domain resource. A meaning of the first information may be determined based on the status of the terminal device.

When a current BWP bundle is on/true, if the first information (the identifier of the first frequency domain resource) configured by the network device includes the CC 0 and the BWP 0 (or the CC 1 and the BWP 0), the terminal device may determine, based on the identifier of the first frequency domain resource, that the second frequency domain resource needing to be activated is a BWP bundle including BWPs in the first column; if the identifier, of the first frequency domain resource, configured by the network device includes the CC 0 and the BWP 1 (or the CC 2 and the BWP 1), the terminal device may determine, based on the identifier of the first frequency domain resource, that the second frequency domain resource needing to be activated is a BWP bundle including BWPs in the second column; if the identifier, of the first frequency domain resource, configured by the network device includes the CC 0 and the BWP 2 (or the CC 1 and the BWP 2, or the CC 2 and the BWP 2), the terminal device may determine, based on the identifier of the first frequency domain resource, that the second frequency domain resource needing to be activated is a BWP bundle including BWPs in the third column; if the identifier, of the first frequency domain resource, configured by the network device includes the CC 0 and the BWP 3 (or the CC 3 and the BWP 3), the terminal device may determine, based on the identifier of the first frequency domain resource, that the second frequency domain resource needing to be activated is a BWP bundle including BWPs in the fourth column.

When a current BWP bundle is off/false, if the identifier, of the first frequency domain resource, configured by the network device includes the CC 0 and the BWP 0, the terminal device may determine, based on the identifier of the first frequency domain resource, that the frequency domain resource needing to be activated is a frequency domain resource corresponding to the BWP 0 on the CC 0; if the identifier of the first frequency domain resource includes the CC 1 and the BWP 1, the terminal device may determine, based on the identifier of the first frequency domain resource, that the frequency domain resource needing to be activated is a frequency domain resource corresponding to the BWP 1 on the CC 1.

The following shows the foregoing described case more clearly with reference to Table 9.

TABLE 9

Example of active frequency domain resources

| First information | BWP bundle on | BWP bundle off |
|---|---|---|
| CC 0 and BWP 0 | Activate the BWP 0 on the CC 0 and a BWP 0 on a CC 1 | Activate the BWP 0 on the CC 0 |
| CC 0 and BWP 1 | Activate the BWP 1 on the CC 0 and a BWP 1 on a CC 2 | Activate the BWP 1 on the CC 0 |
| CC 2 and BWP 2 | Activate a BWP 2 on the CC 0, a BWP 2 on the CC 1, and the BWP 2 on the CC 2 | Activate the BWP 2 on the CC 2 |
| CC 3 and BWP 3 | Activate a BWP 3 on the CC 0 and the BWP 3 on the CC 3 | Activate the BWP 3 on the CC 3 |

In another case, the first information includes the identifier of the first frequency domain resource. A meaning of the first information may be determined based on the status of the terminal device.

When a current BWP bundle is on/true, if the identifier, of the first frequency domain resource, configured by the network device is the BWP 0, the terminal device may determine, based on the identifier of the first frequency domain resource, that the second frequency domain resource needing to be activated is a BWP bundle including BWPs in the first column; if the identifier, of the first frequency domain resource, configured by the network device is the BWP 1, the terminal device may determine, based on the identifier of the first frequency domain resource, that the second frequency domain resource needing to be activated is a BWP bundle including BWPs in the second column; if the identifier, of the first frequency domain resource, configured by the network device is the BWP 2, the terminal device may determine, based on the identifier of the first frequency domain resource, that the second frequency domain resource needing to be activated is a BWP bundle including BWPs in the third column; if the identifier, of the first frequency domain resource, configured by the network device is the BWP 3, the terminal device may determine, based on the identifier of the first frequency domain resource, that the second frequency domain resource needing to be activated is a BWP bundle including BWPs in the fourth column.

If a current BWP bundle is off/false, the identifier, of the first frequency domain resource, configured by the network device may also include only an identifier of a BWP. In this case, an active BWP may be a BWP on a predefined CC or on a CC indicated by the network device (for example, configured by using higher layer signaling). For example, it may be predefined that only a BWP on the CC 0 or a BWP with a small CC number is activated. Based on this, if the identifier, of the first frequency domain resource, configured by the network device is the BWP 0, the terminal device may determine, based on the identifier of the first frequency domain resource, that the frequency domain resource needing to be activated is a frequency domain resource corresponding to the BWP 0 on the CC 0; if the identifier, of the first frequency domain resource, configured by the network device is the BWP 1, the terminal device may determine, based on the identifier of the first frequency domain resource, that the frequency domain resource needing to be activated is a frequency domain resource corresponding to the BWP 1 on the CC 0; if the identifier, of the first frequency domain resource, configured by the network device is the BWP 2, the terminal device may determine, based on the identifier of the first frequency domain resource, that the frequency domain resource needing to be activated is a frequency domain resource corresponding to the BWP 2 on the CC 0; if the identifier, of the first frequency domain resource, configured by the network device is the BWP 3, the terminal device may determine, based on the identifier of the first frequency domain resource, that the frequency domain resource needing to be activated is a frequency domain resource corresponding to the BWP 3 on the CC 0.

The following shows the foregoing described case more clearly with reference to Table 10.

TABLE 10

Example of active frequency domain resources

| First information | BWP bundle on | BWP bundle off (an identifier of a BWP + a predefined CC or a CC indicated by the network device, where, for example, the predefined CC or the CC indicated by the network device is a CC 0) |
| --- | --- | --- |
| BWP 0 | Activate a BWP 0 on a CC 0 and a BWP 0 on a CC 1 | Activate a BWP 0 on the CC 0 |
| BWP 1 | Activate a BWP 1 on the CC 0 and a BWP 1 on a CC 2 | Activate a BWP 1 on the CC 0 |
| BWP 2 | Activate a BWP 2 on the CC 0, a BWP 2 on the CC 1, and a BWP 2 on the CC 2 | Activate a BWP 2 on the CC 0 |
| BWP 3 | Activate a BWP 3 on the CC 0 and a BWP 3 on a CC 3 | Activate a BWP 3 on the CC 0 |

In another case, the first information may include information about N bits, where N may be an integer greater than or equal to 1, and the N bits are used to indicate BWPs having different identifiers. A meaning of the first information may be determined based on the status of the terminal device.

For example, if four BWPs are configured, the first information may include information about 2 bits. For example, 00 indicates a BWP 0, 01 indicates a BWP 1, 10 indicates a BWP 2, and 11 indicates a BWP 3, as shown in Table 11.

TABLE 11

Meanings of bits in an activation field

| Bits | Meaning of indication |
| --- | --- |
| 00 | BWP 0 |
| 01 | BWP 1 |
| 10 | BWP 2 |
| 11 | BWP 3 |

Further, a CC on which a BWP indicated by the first information is located may be indicated by the network device (for example, configured by using higher layer signaling) or may be predefined. For example, it may be predefined that only a BWP on the CC 0 or a BWP with a small CC number is activated, and the first frequency domain resource indicated by the first information may be determined. Based on this, if the first information is 00, the first frequency domain resource indicated by the first information is the BWP 0 on the CC 0; if the first information is 01, the first frequency domain resource indicated by the first information is the BWP 1 on the CC 0; if the first information is 10, the first frequency domain resource indicated by the first information is the BWP 2 on the CC 0; if the first information is 11, the first frequency domain resource indicated by the first information is the BWP 3 on the CC 0.

When a current BWP bundle is on/true, if the first information configured by the network device is 00, the terminal device may determine, based on the first information, that the second frequency domain resource needing to be activated is a BWP bundle including BWPs in the first column; if the first information configured by the network device is 01, the terminal device may determine, based on the first information, that the second frequency domain resource needing to be activated is a BWP bundle including BWPs in the second column; if the first information configured by the network device is 10, the terminal device may determine, based on the first information, that the second frequency domain resource needing to be activated is a BWP bundle including BWPs in the third column; if the first information configured by the network device is 11, the terminal device may determine, based on the first information, that the second frequency domain resource needing to be activated is a BWP bundle including BWPs in the fourth column.

When a current BWP bundle is off/false, if the first information configured by the network device is 00, the terminal device may determine, based on the first information, that the frequency domain resource needing to be activated is a frequency domain resource corresponding to the BWP 0 on the CC 0; if the first information configured by the network device is 01, the terminal device may determine, based on the first information, that the frequency domain resource needing to be activated is a frequency domain resource corresponding to the BWP 1 on the CC 0; if the first information configured by the network device is 10, the terminal device may determine, based on the first information, that the frequency domain resource needing to be activated is a frequency domain resource corresponding to the BWP 2 on the CC 0; if the first information configured by the network device is 11, the terminal device may determine, based on the first information, that the frequency domain resource needing to be activated is a frequency domain resource corresponding to the BWP 3 on the CC 0.

The following shows the foregoing described case more clearly with reference to Table 12.

TABLE 12

Example of active frequency domain resources

| First information | BWP bundle on | BWP bundle off (an identifier of a BWP + a predefined CC or a CC indicated by the network device, where, for example, the predefined CC or the CC indicated by the network device is a CC 0) |
|---|---|---|
| 00 | Activate a BWP 0 on a CC 0 and a BWP 0 on a CC 1 | Activate a BWP 0 on the CC 0 |
| 01 | Activate a BWP 1 on the CC 0 and a BWP 1 on a CC 2 | Activate a BWP 1 on the CC 0 |
| 10 | Activate a BWP 2 on the CC 0, a BWP 2 on the CC 1, and a BWP 2 on the CC 2 | Activate a BWP 2 on the CC 0 |
| 11 | Activate a BWP 3 on the CC 0 and a BWP 3 on a CC 3 | Activate a BWP 3 on the CC 0 |

Example 2: The network device configures a BWP 0, a BWP 1, a BWP 2, and a BWP 3 for a CC 0, configures a BWP 4 and a BWP 5 for a CC 1, configures a BWP 6 and a BWP 7 for a CC 2, and configures a BWP 8 for a CC 3.

The following uses an example in which BWPs on a same CC form a BWP bundle. Table 13 shows an example of a plurality of BWPs configured by the network device.

TABLE 13

Example of a plurality of BWPs

| Identifier of a CC | Identifier of a BWP | | | |
|---|---|---|---|---|
| CC 0 | BWP 0 | BWP 1 | BWP 2 | BWP 3 |
| CC 1 | BWP 4 | | BWP 5 | |
| CC 2 | | BWP 6 | BWP 7 | |
| CC 3 | | | | BWP 8 |

A meaning of the first information may be determined based on the status of the terminal device.

When a current BWP bundle is on/true, if the identifier, of the first frequency domain resource, configured by the network device is the BWP 0 (or the BWP 1, the BWP 2, or the BWP 3), the terminal device may determine, based on the identifier of the first frequency domain resource, that the second frequency domain resource needing to be activated is a frequency domain resource including the BWP 0, the BWP 1, the BWP 2, and the BWP 3; if the identifier, of the first frequency domain resource, configured by the network device is the BWP 4 or the BWP 5, the terminal device may determine, based on the identifier of the first frequency domain resource, that the second frequency domain resource needing to be activated is a frequency domain resource including the BWP 4 and the BWP 5. Others are similar, and details are not described one by one again.

When a current BWP bundle is off/false, if the identifier, of the first frequency domain resource, configured by the network device is the BWP 0, the terminal device may determine, based on the identifier of the first frequency domain resource, that the frequency domain resource needing to be activated is a frequency domain resource corresponding to the BWP 0; if the identifier, of the first frequency domain resource, configured by the network device is the BWP 1, the terminal device may determine, based on the identifier of the first frequency domain resource, that the frequency domain resource needing to be activated is a frequency domain resource corresponding to the BWP 1. Others are similar, and details are not described one by one again.

It should be noted that, because the network device may configure the frequency domain resource for the terminal device in a plurality of manners, the example 1 and the example 2 described above are merely some possible cases. In another configuration manner, reference may be made to the example 1 and the example 2 for execution, and details are not described herein again.

Specifically, the network device may configure the status of the terminal device based on a plurality of factors, for example, usage of the frequency domain resource and a capability of the terminal device. This is not specifically limited. Further, the network device may send the second information to the terminal device in a plurality of implementations, for example, send the second information by using RRC signaling, DCI, or a MAC CE.

For example, the network device may send the second information to the terminal device each time when the first information is sent, to indicate the status of the terminal device. In this case, the first information and the second information may be sent by using a same piece of signaling. For example, the network device sends DCI to the terminal device, where the DCI includes both the first information and the second information. Alternatively, the first information and the second information may be sent by using different signaling.

For another example, the network device may send the second information to the terminal device based on a specified periodicity, or the network device may send the second information to the terminal device when the status of the terminal device changes (for example, the network device changes the status of the terminal device from the first state to the second state). In this case, the terminal device may update the status of the terminal device based on a status indicated by the second information each time when the second information is received.

It should be noted: (1) For a case in which the network device sends the first information by using DCI, if there is one active BWP bundle before the network device sends the first information, the network device may send the DCI (the first information) in a BWP in the active BWP bundle. For example, the BWP may be an initial BWP, a primary frequency domain resource, a BWP with a smallest number (smallest BWP index), or a BWP configured with a control resource set (CORESET) (BWP configured with CORESET) in the BWP bundle. The control resource set is a set including a resource that may be used to transmit a control channel. In other words, the control channel may be transmitted on some or all resources in the control resource set. If there is one active BWP before the network device sends the first information, the network device may send the first information in the active BWP. If there is no active BWP or BWP bundle before the network device sends the first information, the network device may send the first information in a predefined BWP or in a BWP configured by the network device.

In this embodiment of this application, the initial BWP may be a frequency domain resource used by the terminal device to perform synchronization and/or access, receive a synchronization signal, or transmit a system information block (SIB) 1. For example, a BWP with an identifier 0 may be a frequency domain resource used for initial access. The SIB 1 is used to transmit system information, and the terminal device may obtain, based on the SIB 1, a parameter or information related to cell access.

In this embodiment of this application, the primary frequency domain resource may also be referred to as a primary BWP, and may be a frequency domain resource used to transmit a PDCCH. Alternatively, the primary frequency domain resource may be a frequency domain resource including a common search space of a PDCCH.

The foregoing merely shows possible implementations, and this is not specifically limited in this embodiment of this application.

(2) When the foregoing method is applicable to a coordinated multipoint transmission/reception scenario, step 200a, step 201a, and step 202a may be performed by a first transmission point, and the terminal device may communicate with a second transmission point in step 203; or step 200a and step 201a may be performed by a first transmission point, step 202a may be performed by a second transmission point, and the terminal device may communicate with the second transmission point in step 203; or step 200a, step 201a, and step 202a may be performed by a first transmission point, a second transmission point, and a third transmission point respectively, and the terminal device may communicate with the third transmission point in step 203. In other words, in the coordinated multipoint transmission/reception scenario, a transmission point that sends the first information, a transmission point that sends the second information, a transmission point that sends the third information, and a transmission point that communicates with the terminal device may be a same transmission point or may be different transmission points. Various possible cases are not limited in this embodiment of this application. When the transmission points are different transmission points, the transmission points may be a plurality of base stations that perform coordinated transmission. Alternatively, the transmission points may be a plurality of cells that belong to a same base station and that perform coordinated transmission. Alternatively, the transmission points may be other nodes that perform coordinated transmission. This is not specifically limited.

Further, in this embodiment of this application, after the terminal device activates a BWP or a BWP bundle according to the method described above, the BWP or the BWP bundle is in an active state. The terminal device may start a timer. If the terminal device does not detect DCI (the DCI may be used to schedule the BWP or the BWP bundle) on the active BWP or the active BWP bundle within a time specified by the timer, the terminal device may deactivate the BWP or the BWP bundle.

It may be understood that in another possible implementation, the active BWP or the active BWP bundle may alternatively be predefined, or the network device indicates, in another manner, the terminal device to activate the BWP or the BWP bundle. This is not limited in this embodiment of this application. In other words, for a BWP or a BWP bundle activated in various possible manners, the terminal device may deactivate the BWP or the BWP bundle in the foregoing timing manner.

In this embodiment of this application, according to the foregoing method, the terminal device may determine, based on the received first information, to communicate with the network device on the second frequency domain resource when the status of the terminal device is the first state. In an aspect, because the second frequency domain resource includes the plurality of segments of contiguous frequency domain resources, data transmission in a discrete spectrum can be implemented, and use efficiency of the spectrum can be improved. In another aspect, because the first information is used to indicate the identifier of the first frequency domain resource (BWP), an existing manner of indicating a BWP may be used, implementation is relatively easy, and adaptability is relatively strong. In still another aspect, the status of the terminal device may be flexibly set based on an actual requirement. For example, the status of the terminal device may be the second state, and in this case, the terminal device may communicate with the network device on the first frequency domain resource; or the status of the terminal device may be another possible state. Therefore, through introduction of the status of the terminal device, the network device and the terminal device may adjust, based on an actual situation, a frequency domain resource occupied for communication, to help properly use a spectrum resource.

Embodiment 2

Figure 3:
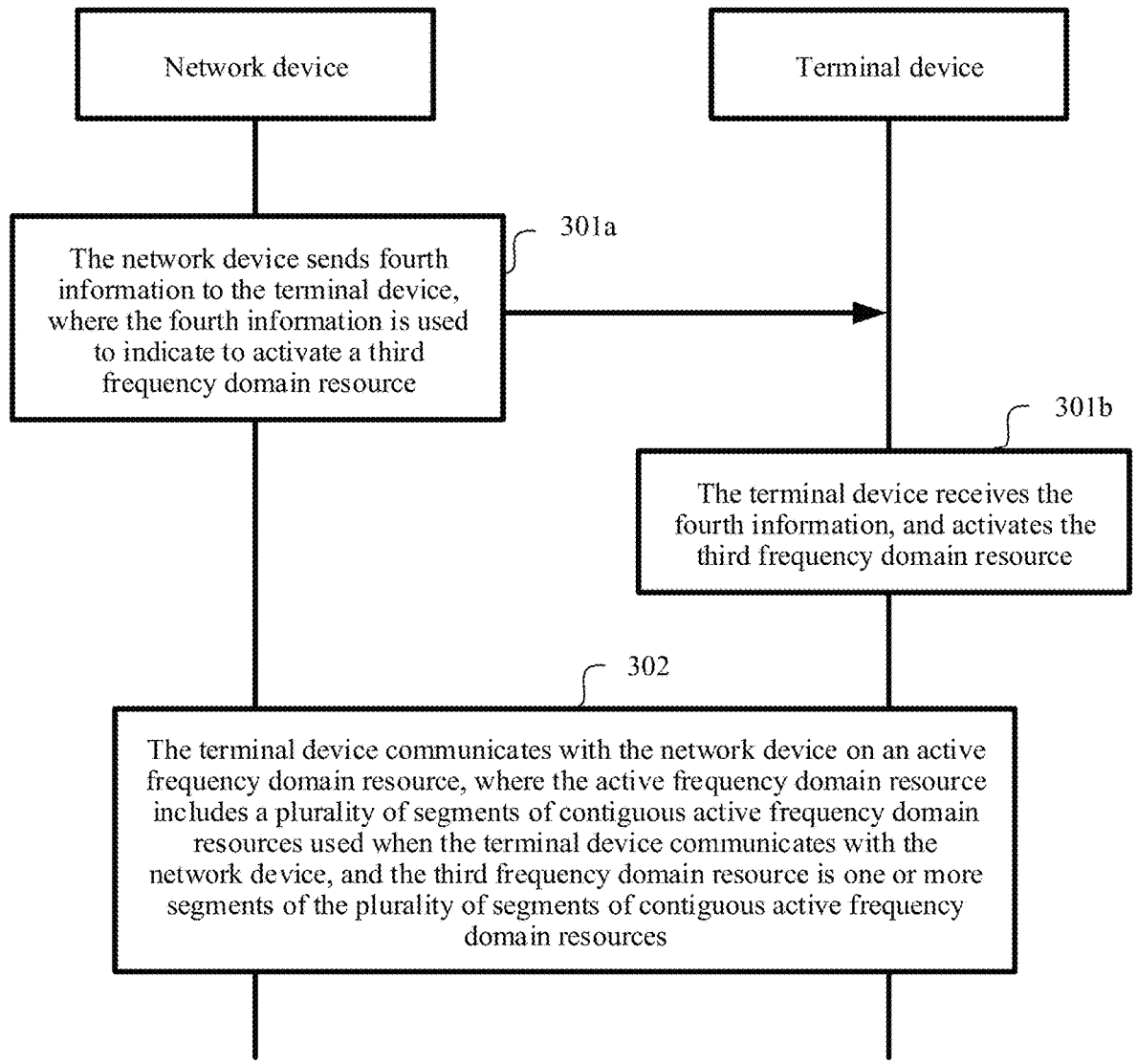
FIG. 3 is a schematic flowchart of a communication method according to Embodiment 2 of this application.

FIG. 3 is a schematic flowchart of a communication method according to Embodiment 2 of this application. As shown in FIG. 3, the method includes the following steps.

Step 301a: A network device sends fourth information to a terminal device, where the fourth information is used to indicate to activate a third frequency domain resource.

Correspondingly, in step 301b, the terminal device receives the fourth information, and activates the third frequency domain resource.

Herein, the network device may send the fourth information to the terminal device in a plurality of implementations, for example, send the fourth information by using RRC signaling, DCI, or a MAC CE.

In an implementation, the fourth information may be further used to indicate to deactivate a fourth frequency domain resource, and the fourth frequency domain resource is a frequency domain resource activated before the fourth information is received. For example, the fourth information may include an activation field and a deactivation field, where the activation field may carry an identifier of the third frequency domain resource, and the deactivation field may carry an identifier of the fourth frequency domain resource. In this way, after receiving the fourth information, the terminal device may activate the third frequency domain resource based on the identifier of the third frequency domain resource, and deactivate the fourth frequency domain resource based on the identifier of the fourth frequency domain resource. The third frequency domain resource may include one or more BWPs, and the fourth frequency domain resource may include one or more BWPs.

Step 302: The terminal device communicates with the network device on an active frequency domain resource.

Herein, the active frequency domain resource includes a plurality of segments of contiguous active frequency domain resources used when terminal device communicates with network device, and the third frequency domain resource may be one or more segments of the plurality of segments of contiguous active frequency domain resources. If the third frequency domain resource is one segment of the plurality of segments of contiguous active frequency domain resources, the active frequency domain resource may further include a fifth frequency domain resource, and the fifth frequency domain resource is a frequency domain resource activated before the fourth information is received. The fifth frequency domain resource may include one or more BWPs.

The following specifically describes the method shown in FIG. 3 with reference to specific embodiments (Embodiment 3 and Embodiment 4).

Embodiment 3

Figure 4:
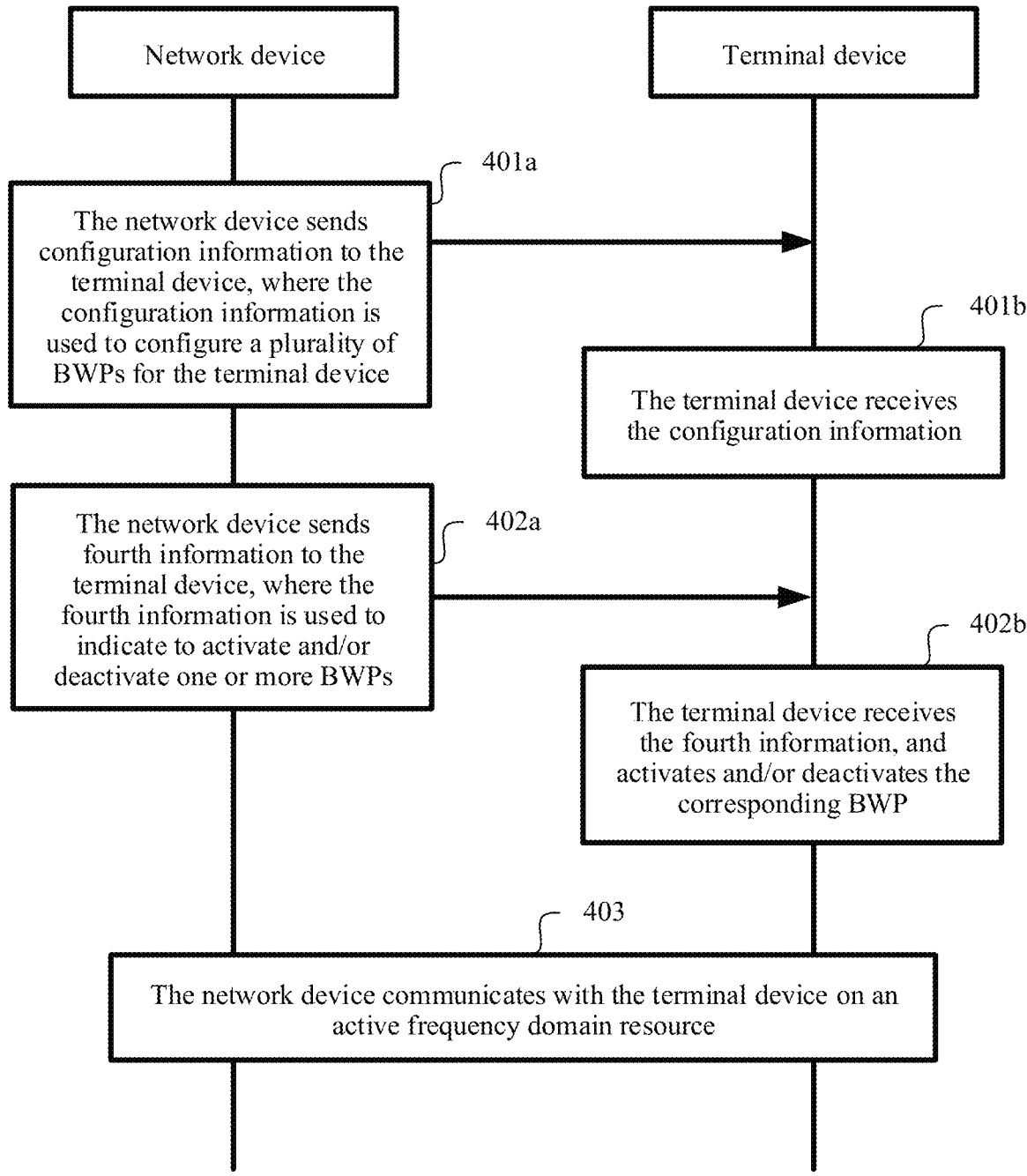
FIG. 4 is a schematic flowchart of a communication method according to Embodiment 3 of this application.

FIG. 4 is a schematic flowchart of a communication method according to Embodiment 3 of this application. As shown in FIG. 4, the method includes the following steps.

Step 401a: A network device sends configuration information to a terminal device, where the configuration information is used to configure a plurality of BWPs for the terminal device.

For example, the plurality of BWPs include a BWP 0, a BWP 1, a BWP 2, and a BWP 3.

Correspondingly, in step 401b, the terminal device receives the configuration information.

Herein, the network device may send the configuration information to the terminal device by using higher layer signaling (for example, RRC signaling).

Step 402a: The network device sends fourth information to the terminal device, where the fourth information is used to indicate to activate and/or deactivate one or more BWPs. Herein, the network device may send the fourth information to the terminal device by using DCI.

In an implementation, the fourth information may include an activation field and a deactivation field. Based on the foregoing example, the activation field may carry information about 2 bits. For example, 00 indicates that the BWP 0 is to be activated, 01 indicates that the BWP 1 is to be activated, 10 indicates that the BWP 2 is to be activated, and 11 indicates that the BWP 3 is to be activated, as shown in Table 14.

TABLE 14

Meanings of bits in an activation field

| Bits | Corresponding meaning |
|------|----------------------|
| 00 | Activate a BWP 0 |
| 01 | Activate a BWP 1 |
| 10 | Activate a BWP 2 |
| 11 | Activate a BWP 3 |

The deactivation field may carry information about 2 bits. For example, a plurality of BWPs other than a BWP to be activated in the activation field are sorted in ascending order of numbers, and 00 indicates that no BWP is to be deactivated, 01 indicates that the first BWP (first BWP other than the active BWP), namely, a BWP with a smallest number, is to be deactivated, 10 indicates that the second BWP (second BWP other than the active BWP) is to be deactivated, and 11 indicates that the third BWP (third BWP other than the active BWP) is to be deactivated, as shown in Table 15.

TABLE 15

Meanings of bits in a deactivation field

| Bits | Corresponding meaning |
|------|----------------------|
| 00 | No BWP to be deactivated exists |
| 01 | Deactivate the first BWP |
| 10 | Deactivate the second BWP |
| 11 | Deactivate the third BWP |

For example, if the BWP to be activated in the activation field is the BWP 0, and three BWPs other than the BWP 0 are sorted in ascending order of numbers and are separately: the BWP 1, the BWP 2, and the BWP 3, 01 indicates that the BWP 1 is to be deactivated, 10 indicates that the BWP 2 is to be deactivated, and 11 indicates that the BWP 3 is to be deactivated. For another example, if the BWP to be activated in the activation field is the BWP 2, and three BWPs other than the BWP 2 are sorted in ascending order of numbers and are separately: the BWP 0, the BWP 1, and the BWP 3, 01 indicates that the BWP 0 is to be deactivated, 10 indicates that the BWP 1 is to be deactivated, and 11 indicates that the BWP 3 is to be deactivated.

In another possible example, a plurality of BWPs may be simultaneously activated. For example, the activation field may carry information about 3 bits, where 000 indicates that the BWP 0 and the BWP 1 are simultaneously activated. Similarly, a plurality of BWPs may also be simultaneously deactivated. For example, 101 indicates that the BWP 0 and the BWP 1 are simultaneously deactivated. Details are not described again.

Optionally, a quantity and a meaning of the bits in the activation field and/or the deactivation field in the foregoing example are merely examples, and another quantity and/or another meaning of the bits may also be used. This is not specifically limited in this application.

In another implementation, the fourth information may be used only to indicate to activate a plurality of BWPs. Based on the foregoing example, a plurality of BWPs may be activated by using a 4-bit bitmap, where 1 indicates that a BWP is to be activated, and 0 indicates that a BWP is not to be activated. Table 16 shows an example of activating a plurality of BWPs.

TABLE 16

Example of activating a plurality of BWPs

| Bit | 1 | 1 | 0 | 0 |
|-----|---|---|---|---|
| BWP | BWP 0 | BWP 1 | BWP 2 | BWP 3 |

It can be learned from Table 16 that the fourth information may include 1100, indicating that the BWP 0 and the BWP 1 are activated.

Optionally, a plurality of active BWPs may form a BWP bundle, and the terminal device and the network device may communicate with each other on a frequency domain resource corresponding to the BWP bundle.

In another implementation, the network device configures a BWP 0, a BWP 1, a BWP 2, and a BWP 3 for a CC 0, configures a BWP 0 and a BWP 2 for a CC 1, configures a BWP 2 for a CC 2, and configures a BWP 3 for a CC 3. BWPs having a same identifier form a BWP bundle. Table 17 shows an example of a plurality of BWPs configured by the network device.

TABLE 17

Example of a plurality of BWPs

| Identifier of a CC | Identifier of a BWP | | | |
|--------------------|--------|-------|-------|-------|
| CC 0 | BWP 0 | BWP 1 | BWP 2 | BWP 3 |
| CC 1 | BWP 0 | | BWP 2 | |
| CC 2 | | | BWP 2 | |
| CC 3 | | | | BWP 3 |

It can be learned from Table 17 that the BWP 0 on the CC 0 and the BWP 0 on the CC 1 form a BWP bundle, the BWP 2 on the CC 0, the BWP 2 on the CC 1, and the BWP 2 on the CC 2 form a BWP bundle, and the BWP 3 on the CC 0 and the BWP 3 on the CC 3 form a BWP bundle.

In this case, identifiers (namely, numbers) of BWPs on different CCs overlap. For example, the fourth information may include an identifier of a BWP. To be specific, the network device may indicate, by indicating the identifier of the BWP, to activate a BWP bundle including the BWP having the identifier or activate the BWP having the identifier. For example, if the fourth information includes the BWP 0, the terminal device may determine that a frequency domain resource needing to be activated is a BWP bundle including BWPs in the first column (the BWP 0 on the CC 0 and the BWP 0 on the CC 1); if the fourth information includes the BWP 1, the terminal device may determine that a frequency domain resource needing to be activated is the BWP 1 on the CC 0 (because there is no other BWP having a same identifier as the BWP 1 on the CC 0, the frequency domain resource needing to be activated in this case may be one BWP); if the fourth information includes the BWP 2, the terminal device may determine that a frequency domain resource needing to be activated is a BWP bundle including BWPs in the third column (the BWP 2 on the CC 0, the BWP 2 on the CC 1, and the BWP 2 on the CC 2); if the fourth information includes the BWP 3, the terminal device may determine that a frequency domain resource needing to be activated is a BWP bundle including BWPs in the fourth column (the BWP 3 on the CC 0 and the BWP 3 on the CC 3).

In other words, after the network device indicates the identifier of the BWP, if there are a plurality of BWPs (which form a BWP bundle) having the identifier, the terminal device may activate the BWP bundle; if there is only one BWP having the identifier, the terminal device may activate only the BWP.

For another example, the fourth information may include information about M bits, where M may be an integer greater than or equal to 1.

For example, if four BWPs are configured, the fourth information may include information about 2 bits. For example, 00 indicates a BWP 0, 01 indicates a BWP 1, 10 indicates a BWP 2, and 11 indicates a BWP 3, as shown in Table 18.

TABLE 18

Meanings of bits in an activation field

| Bits | Meaning of indication |
|---|---|
| 00 | BWP 0 |
| 01 | BWP 1 |
| 10 | BWP 2 |
| 11 | BWP 3 |

If the fourth information includes 00, the terminal device may determine that a frequency domain resource needing to be activated is a BWP bundle including BWPs in the first column (the BWP 0 on the CC 0 and the BWP 0 on the CC 1); if the fourth information includes 01, the terminal device may determine that a frequency domain resource needing to be activated is the BWP 1 on the CC 0; if the fourth information includes 10, the terminal device may determine that a frequency domain resource needing to be activated is a BWP bundle including BWPs in the third column (the BWP 2 on the CC 0, the BWP 2 on the CC 1, and the BWP 2 on the CC 2); if the fourth information includes 11, the terminal device may determine that a frequency domain resource needing to be activated is a BWP bundle including BWPs in the fourth column (the BWP 3 on the CC 0 and the BWP 3 on the CC 3).

Step 402b: The terminal device receives the fourth information, and activates and/or deactivates the corresponding BWP.

Herein, after configuring a frequency domain resource for the terminal device, the network device may send the fourth information to the terminal device on a default active BWP (or a predefined BWP); or the network device may send the fourth information to the terminal device on a BWP that has been previously activated. For example, before the network device sends the fourth information, if the BWP that has been activated includes the BWP 0 and the BWP 1, the network device may send the fourth information to the terminal device on the BWP 0 or the BWP 1. For example, information carried in the activation field of the fourth information is 000, and information carried in the deactivation field of the fourth information is 000. In this case, after receiving the fourth information, the terminal device may activate the BWP 0 and the BWP 1, and does not perform a deactivation operation. In this case, the active BWP 0 and the active BWP 1 may form a BWP bundle. For another example, information carried in the activation field of the fourth information is 10, and information carried in the deactivation field of the fourth information is 001. In this case, after receiving the fourth information, the terminal device may activate the BWP 2, and deactivate the BWP 0. In this case, an active frequency domain resource includes the BWP 1 and the BWP 2, and the BWP 1 and the BWP 2 may form a BWP bundle.

It should be noted that when the fourth information is used only to indicate to activate a plurality of BWPs (for example, the BWP 0 and the BWP 1), after activating the BWP 0 and the BWP 1, the terminal device may deactivate a BWP that has been activated before the BWP 0 and the BWP 1 are activated (that is, automatic deactivation).

It can be learned from the foregoing content that after configuring the frequency domain resource for the terminal device, the network device may send the fourth information to the terminal device for a plurality of times, and update the active frequency domain resource by including different information in the activation field and the deactivation field.

Step 403: The network device communicates with the terminal device on the active frequency domain resource.

According to the foregoing method, the network device may indicate, by using the fourth information, the terminal device to activate one BWP, and after the terminal device activate a new BWP, the new BWP and the previously activated BWP may form a BWP bundle, that is, the BWP bundle is activated in an accumulative manner. Alternatively, the network device may directly indicate the terminal device to activate a plurality of BWPs, and the plurality of active BWPs form a BWP bundle. The network device and the terminal device communicate with each other in the active BWP bundle, and therefore, data transmission in a discrete spectrum is implemented, and use efficiency of the spectrum is improved. In addition, according to the method, existing configuration information (higher layer signaling) does not need to be changed, and this has relatively strong adaptability.

Embodiment 4

Figure 5:
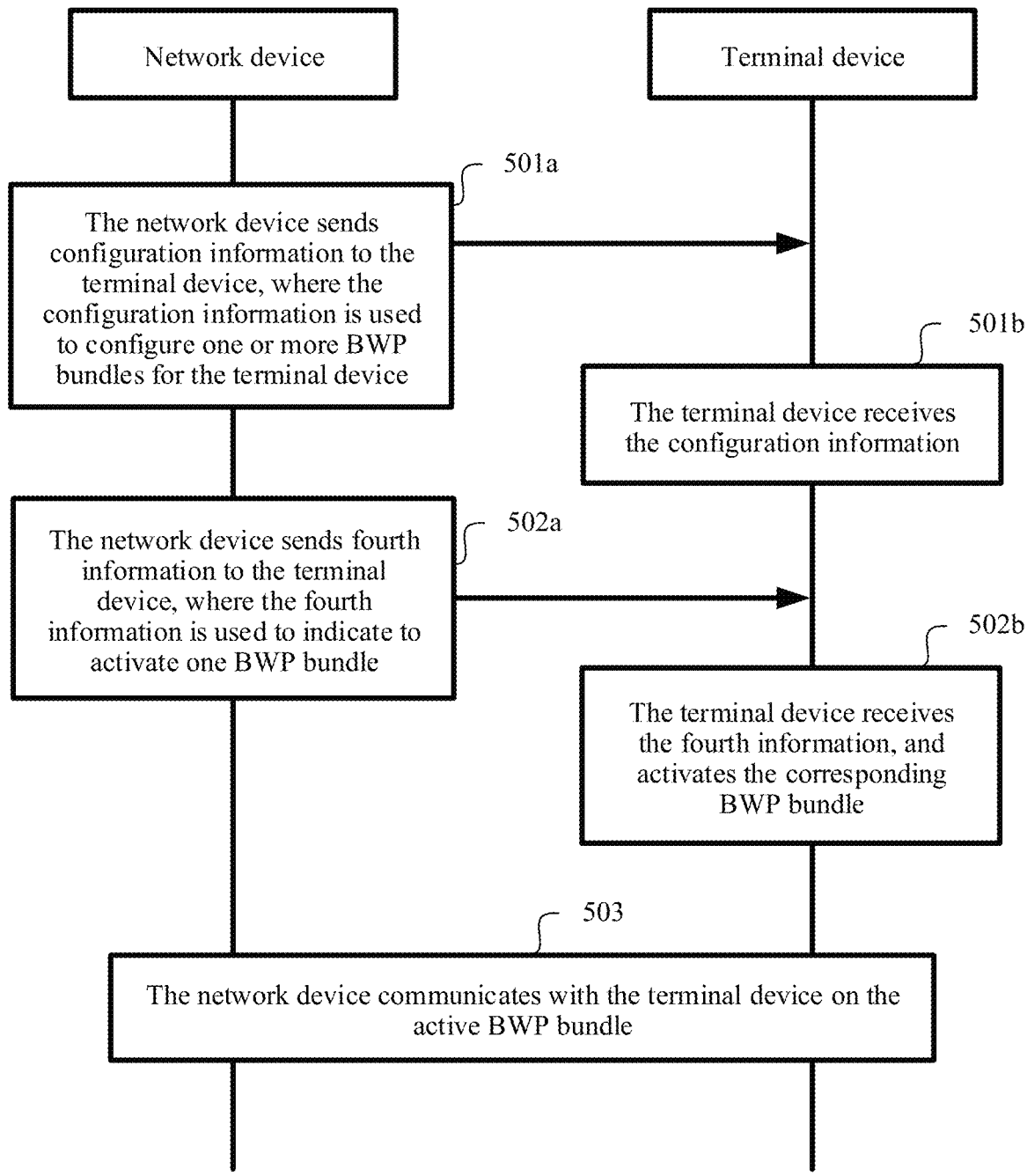
FIG. 5 is a schematic flowchart of a communication method according to Embodiment 4 of this application.

FIG. 5 is a schematic flowchart of a communication method according to Embodiment 4 of this application. As shown in FIG. 5, the method includes the following steps.

Step 501*a*: A network device sends configuration information to a terminal device, where the configuration information is used to configure one or more BWP bundles for the terminal device.

For example, the configuration information may be used to configure a BWP bundle 0, a BWP bundle 1, and a BWP bundle 2 for the terminal device.

Correspondingly, in step 501*b*, the terminal device receives the configuration information.

Herein, the network device may send the configuration information to the terminal device by using higher layer signaling (for example, RRC signaling).

In an implementation, the network device may configure that the BWP bundle 0 includes a BWP 0 and a BWP 1, the BWP bundle 1 includes a BWP 1 and a BWP 2, and the BWP bundle 2 includes a BWP 3, a BWP 4, and a BWP 5; or the network device may configure that the BWP bundle 0 includes a BWP 0 on a CC 0 and a BWP 0 on a CC 1, the BWP bundle 1 includes a BWP 1 on the CC 0 and a BWP 1 on the CC 1, and the BWP bundle 2 includes a BWP 1 on the CC 0, a BWP 2 on the CC 0, and a BWP 2 on the CC 1. It can be understood that an explicit configuration manner is used in this case.

In this embodiment of this application, BWPs included in the plurality of BWP bundles configured by the network device for the terminal device may partially overlap (for example, both the BWP bundle 0 and the BWP bundle 1 include the BWP 1) or do not overlap. This is not specifically limited.

In another implementation, the network device may configure a plurality of BWPs for the terminal device, and the terminal device determines a BWP bundle according to a preset rule. A parameter of a BWP may include at least one of an identifier of the BWP, a subcarrier spacing, a CP length, or an identifier of a CC on which the BWP is located. For example, the preset rule may be that BWPs having a same identifier form a BWP bundle. It can be understood that an implicit configuration manner is used in this case.

Step 502*a*: The network device sends fourth information to the terminal device, where the fourth information is used to indicate to activate one BWP bundle. Herein, the network device may send the fourth information to the terminal device by using higher layer signaling or DCI. Further, the configuration information and the fourth information may be sent by using a same piece of signaling, or may be sent by using different signaling.

If the explicit configuration manner is used, in an implementation, the fourth information may include an identifier of a to-be-activated BWP bundle (for example, the BWP bundle 0); in another implementation, the fourth information may carry information about 2 bits. For example, 00 indicates that the BWP bundle 0 is to be activated, 01 indicates that the BWP bundle 1 is to be activated, and 10 indicates that the BWP bundle 2 is to be activated.

If the implicit configuration manner is used, in an implementation, the fourth information may include an identifier of a BWP, and the identifier of the BWP is used to indicate to activate a plurality of BWPs having the identifier (where the plurality of BWPs having the identifier form a BWP bundle).

Step 502*b*: The terminal device receives the fourth information, and activates the corresponding BWP bundle.

In an implementation, if there is an active BWP bundle (for example, the BWP bundle 1) before the fourth information is received, the terminal device may further deactivate the BWP bundle 1.

It can be learned from the foregoing content that after configuring the BWP bundle for the terminal device, the network device may send the fourth information to the terminal device for a plurality of times, and update the active BWP bundle by including different information in the fourth information.

Step 503: The network device communicates with the terminal device on the active BWP bundle.

It should be noted that if the network device configures only one BWP bundle, the terminal device may activate the BWP bundle after receiving the configuration information (configuration is activation), and step 502*a* and step 502*b* do not need to be performed.

According to the foregoing method, when configuring a frequency domain resource for the terminal device, the network device may directly configure one or more BWP bundles, and subsequently indicate, by using the fourth information, to activate one of the BWP bundles. Therefore, data transmission in a discrete spectrum is implemented, and use efficiency of the spectrum is improved.

In another possible embodiment, when configuring a frequency domain resource for the terminal device, the network device may alternatively jointly number a BWP and a BWP bundle. Table 19 shows an example of joint numbering.

TABLE 19

Example of joint numbering

| Type | Number |
| --- | --- |
| BWP | BWP 0 |
| BWP | BWP 1 |
| BWP | BWP 2 |
| BWP bundle | BWP 3 = BWP 0 + BWP 1 |

In this case, the fourth information may indicate, by using 2 bits, to activate one BWP or one BWP bundle thereof. For example, 00 indicates that the BWP bundle (numbered as the BWP 3) is to be activated, 01 indicates that the BWP 0 is to be activated, 10 indicates that the BWP 1 is to be activated, and 11 indicates that the BWP 2 is to be activated; or 00 indicates that the BWP 0 is to be activated, 01 indicates that the BWP 1 is to be activated, 10 indicates that the BWP 2 is to be activated, and 11 indicates that the BWP bundle (numbered as the BWP 3) is to be activated. Therefore, the network device may communicate with the terminal device on the BWP or the BWP bundle. It should be noted that, in an implementation, the terminal device may activate a new BWP or a new BWP bundle, and deactivate the BWP or the BWP bundle that has been previously activated.

Table 20 shows another example of joint numbering.

TABLE 20

Example of joint numbering

| Type | Number |
| --- | --- |
| BWP | BWP 0 |
| BWP | BWP 1 |
| BWP | BWP 2 |
| BWP | BWP 3 |
| BWP bundle | BWP 4 = BWP 0 + BWP 1 |
| BWP bundle | BWP 5 = BWP 0 + BWP 2 |
| BWP bundle | BWP 6 = BWP 1 + BWP 2 |
| BWP bundle | BWP 7 = BWP 2 + BWP 3 |

In this case, the fourth information may indicate, by using 3 bits, to activate one BWP or one BWP bundle thereof. For example, 000 indicates that the BWP 0 is to be activated, 001 indicates that the BWP 1 is to be activated, 010 indicates that the BWP 2 is to be activated, 011 indicates that the BWP 3 is to be activated, 100 indicates that the BWP 4 is to be activated, 101 indicates that the BWP 5 is to be activated, 110 indicates that the BWP 6 is to be activated, and 111 indicates that the BWP 7 is to be activated. Therefore, the network device may communicate with the terminal device on the BWP or the BWP bundle. It should be noted that, in an implementation, the terminal device may activate a new BWP or a new BWP bundle, and deactivate the BWP or the BWP bundle that has been previously activated.

For Embodiment 2 to Embodiment 4, it should be noted:

(1) For a case in which the network device sends the fourth information by using DCI, if there is one active BWP bundle before the network device sends the fourth information, the network device may send the DCI (the fourth information) in a BWP in the active BWP bundle. For example, the BWP may be an initial BWP, a primary frequency domain resource, a BWP with a smallest number (smallest BWP index), or a BWP configured with a CORESET (BWP configured with CORESET) in the BWP bundle. The control resource set is a set including a resource that may be used to transmit a control channel. In other words, the control channel may be transmitted on some or all resources in the control resource set. In the embodiments of this application, the initial BWP may be a frequency domain resource used by the terminal device to perform synchronization and/or access, receive a synchronization signal, or transmit a system information block (SIB) 1. For example, a BWP with an identifier 0 may be a frequency domain resource used for initial access. The SIB 1 is used to transmit system information, and the terminal device may obtain, based on the SIB 1, a parameter or information related to cell access.

In the embodiments of this application, the primary frequency domain resource may also be referred to as a primary BWP, and may be a frequency domain resource used to transmit a PDCCH. Alternatively, the primary frequency domain resource may be a frequency domain resource including a common search space of a PDCCH.

If there is one active BWP before the network device sends the fourth information, the network device may send the fourth information in the active BWP. If there is no active BWP or BWP bundle before the network device sends the fourth information, the network device may send the fourth information in a predefined BWP or in a BWP configured by the network device.

The foregoing merely shows possible implementations, and this is not specifically limited in the embodiments of this application.

(2) In a coordinated multipoint transmission/reception scenario, a transmission point that sends the fourth information, a transmission point that sends the configuration information, and a transmission point that communicates with the terminal device may be a same transmission point or may be different transmission points. Various possible cases are not limited in the embodiments of this application. When the transmission points are different transmission points, the transmission points may be a plurality of base stations that perform coordinated transmission. Alternatively, the transmission points may be a plurality of cells that belong to a same base station and that perform coordinated transmission. Alternatively, the transmission points may be other nodes that perform coordinated transmission. This is not specifically limited.

For Embodiment 1 to Embodiment 4, it should be noted: (1) Mutual adaptive reference may be made to solutions provided in Embodiment 1 to Embodiment 4. During specific implementation, the technical solutions provided in Embodiment 1 to Embodiment 4 may be used independently, or a possible design in a specific embodiment may be combined with another embodiment, to form a new solution for use. Details are not described herein again. (2) The first information, the second information, the third information, and the fourth information in the embodiments of this application are merely used as names for differentiation. During actual application, the first information, the second information, the third information, and the fourth information may have specific names or different names from those used in this application. This is not limited in this application. (3) Step numbers involved in Embodiment 1 to Embodiment 4 are merely an example of procedure execution, and do not constitute a specific limitation on an execution sequence of the steps.

It may be understood that, to implement the foregoing functions, the devices, in the foregoing embodiments, each may include a corresponding hardware structure and/or software module for performing each function. A person skilled in the art should easily be aware that, in combination with the examples described in the embodiments disclosed in this specification, units and algorithms steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 6:
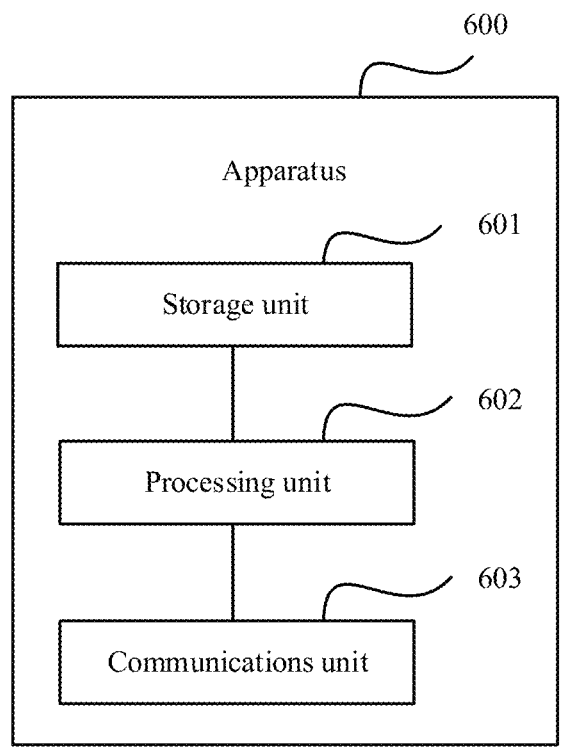
FIG. 6 is a schematic structural diagram of an apparatus according to an embodiment of this application.

When an integrated unit is used, FIG. 6 is a block diagram of a possible example of an apparatus according to an embodiment of the present invention. The apparatus 600 may exist in a form of software. The apparatus 600 may include a processing unit 602 and a communications unit 603. The processing unit 602 is configured to control and manage an action of the apparatus 600. The communications unit 603 is configured to support the apparatus 600 in communicating with another network entity. The apparatus 600 may further include a storage unit 601, configured to store program code and data of the apparatus 600.

The processing unit 602 may be a processor or a controller, such as a general-purpose central processing unit (CPU), a general-purpose processor, a digital signal processor (DSP), an application-specific integrated circuit (ASIC), a field programmable gate array (FPGA), another programmable logic device, a transistor logic device, a hardware component, or any combination thereof. The processing unit 602 may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications unit 603 may be a communications interface, a transceiver, a transceiver circuit, or the like, where the communications interface is a general name, and may include a plurality of interfaces during specific implementation. The storage unit 601 may be a memory.

The apparatus 600 may be the terminal device in this application, or may be a chip in the terminal device. The processing unit 602 may support the apparatus 600 in performing an action of the terminal device in the foregoing method examples. The communications unit 603 may support communication between the apparatus 600 and a network device. For example, the communications unit 603 is configured to support the apparatus 600 in performing step 200*b*, step 201*b*, and step 202*b* in FIG. 2.

Specifically, the communications unit 603 is configured to: receive first information, where the first information is used to indicate an identifier of a first frequency domain resource, and the first frequency domain resource is contiguous in frequency domain; and when the processing unit 602 determines that a status of the apparatus 600 is a first state, communicate, based on the first information, with the network device on a second frequency domain resource, where the second frequency domain resource includes a plurality of segments of contiguous frequency domain resources, and the first frequency domain resource is one segment of the plurality of segments of contiguous frequency domain resources.

In a possible implementation, the communications unit 603 is further configured to: when the processing unit 602 determines that the status of the apparatus 600 is a second state, communicate with the network device on the first frequency domain resource.

In a possible implementation, the first state is a bandwidth part bundle active state, and/or the second state is a bandwidth part active state.

In a possible implementation, the communications unit 603 is further configured to: receive second information sent by the network device, where the second information is used to indicate the status of the apparatus 600.

In a possible implementation, the communications unit 603 is further configured to: receive third information, where the third information is used by the terminal device to determine the second frequency domain resource.

In a possible implementation, the first frequency domain resource is a bandwidth part (BWP); and the first information includes an identifier of the BWP, or the first information includes an identifier of the BWP and an identifier of a component carrier (CC) on which the BWP is located.

The apparatus 600 may alternatively be the network device in this application, or may be a chip in the network device. The processing unit 602 may support the apparatus 600 in performing an action of the network device in the foregoing method examples. The communications unit 603 may support communication between the apparatus 600 and another device (for example, a collection device or a presentation device). For example, the communications unit 603 is configured to support the apparatus 600 in performing step 200*a*, step 201*a*, and step 202*a* in FIG. 2.

Specifically, the communications unit 603 is configured to: send first information to a terminal device, where the first information is used to indicate an identifier of a first frequency domain resource, and the first frequency domain resource is contiguous in frequency domain; and when the processing unit 602 determines that a status of the terminal device is a first state, communicate with the terminal device on a second frequency domain resource, where the second frequency domain resource includes a plurality of segments of contiguous frequency domain resources, and the first frequency domain resource is one segment of the plurality of segments of contiguous frequency domain resources.

In a possible implementation, the communications unit 603 is further configured to: when the processing unit 602 determines that the status of the terminal device is a second state, communicate with the terminal device on the first frequency domain resource.

In a possible implementation, the first state is a bandwidth part bundle active state, and/or the second state is a bandwidth part active state.

In a possible implementation, the communications unit 603 is further configured to: send second information to the terminal device, where the second information is used to indicate the status of the terminal device.

In a possible implementation, the communications unit 603 is further configured to: send third information to the terminal device, where the third information is used by the terminal device to determine the second frequency domain resource.

In a possible implementation, the first frequency domain resource is a bandwidth part (BWP); and the first information includes an identifier of the BWP, or the first information includes an identifier of the BWP and an identifier of a component carrier (CC) on which the BWP is located.

Figure 7:
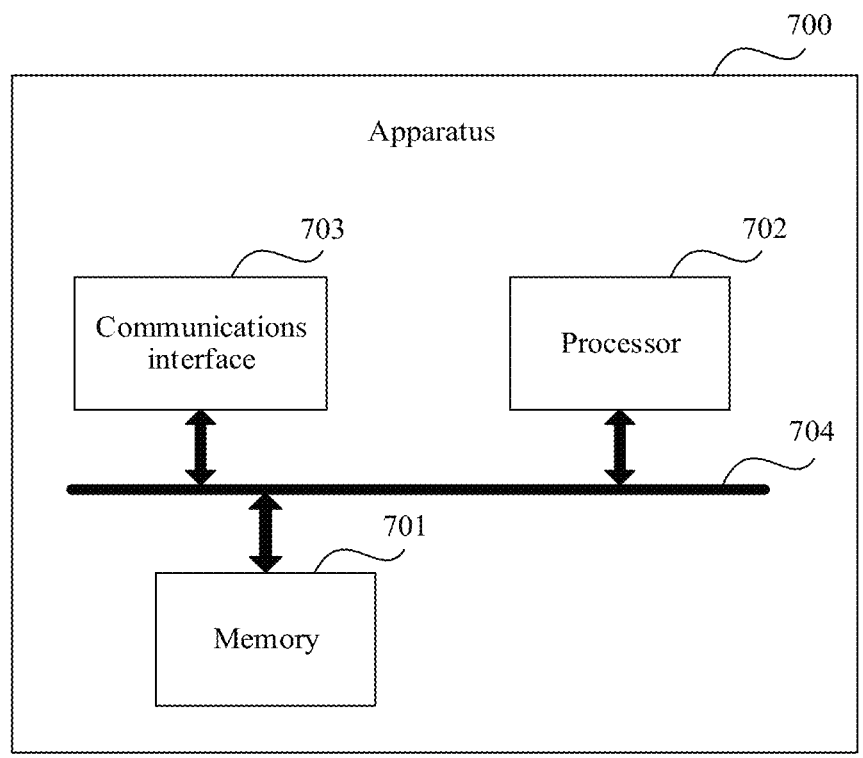
FIG. 7 is a schematic structural diagram of another apparatus according to an embodiment of this application.

FIG. 7 is a schematic diagram of an apparatus according to an embodiment of this application. The apparatus may be the terminal device or the network device, or may be a chip disposed in the terminal device or the network device. The apparatus 700 includes a processor 702, a communications interface 703, and a memory 701. Optionally, the apparatus 700 may further include a bus 704. The communications interface 703, the processor 702, and the memory 701 may be connected to each other through a communications line 704. The communications line 704 may be a peripheral component interconnect (PCI) bus, an extended industry standard architecture (EISA) bus, or the like. The communications line 704 may be classified into an address bus, a data bus, a control bus, and the like. For ease of representation, only one thick line is used to represent the bus in FIG. 7, but this does not mean that there is only one bus or only one type of bus.

The processor 702 may be a CPU, a microprocessor, an ASIC, or one or more integrated circuits configured to control program execution in the solutions of this application.

The communications interface 703 uses any transceiver-type apparatus, to communicate with another device or a communications network such as the Ethernet, a radio access network (RAN), a wireless local area network (WLAN), or a wired access network.

The memory 701 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor through the communications line 704. The memory may alternatively be integrated with the processor.

The memory 701 is configured to store a computer-executable instruction for executing the solutions in this application, and the processor 702 controls the execution. The processor 702 is configured to execute the computer-executable instruction stored in the memory 701, to implement the method provided in the foregoing embodiments of this application.

Optionally, the computer-executable instruction in the embodiments of this application may also be referred to as application program code. This is not specifically limited in the embodiments of this application.

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments of the present invention are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

This application is described with reference to the flowcharts and/or block diagrams of the method, the apparatus (device), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Therefore, although this application is described with reference to specific features and the embodiments thereof, clearly, various modifications and combinations may be made to them without departing from the spirit and scope of this application. Correspondingly, this specification and accompanying drawings are merely example description of this application defined by the accompanying claims, and is considered as any of or all modifications, variations, combinations or equivalents that cover the scope of this application. Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, wherein the method comprises:

receiving, by a terminal device, first information, wherein the first information is used to indicate an identifier of a first frequency domain resource, and the first frequency domain resource is contiguous in frequency domain;

receiving, by the terminal device, third information, wherein the third information indicates a correspondence between the first frequency domain resource and a second frequency domain resource, wherein the second frequency domain resource comprises a plurality of segments of contiguous frequency domain resources, and the first frequency domain resource is one segment of the plurality of segments of contiguous frequency domain resources; and when a status of the terminal device is a first state:

determining, by the terminal device based on the identifier of the first frequency domain resource indicated by the first information and the correspondence indicated by the third information, the second frequency domain resource for communicating with a network device; and communicating, by the terminal device based on the identifier of the first frequency domain resource indicated by the first information and the correspondence indicated by the third information, the second frequency domain resource for communicating with a network device; and communicating, by the terminal device, with the network device on the second frequency domain resource.

2. The method according to claim 1, the method further comprises:

when the status of the terminal device is a second state, communicating, by the terminal device, with the network device on the first frequency domain resource.

3. The method according to claim 2, wherein at least one of the following is true:
the first state is a bandwidth part bundle active state; or
the second state is a bandwidth part active state.

4. The method according to claim 1, wherein the method further comprises:
receiving, by the terminal device, second information sent by the network device, wherein the second information indicates the status of the terminal device.

5. A communication method, wherein the method comprises:
sending, by a network device, first information to a terminal device, wherein the first information indicates an identifier of a first frequency domain resource, and wherein the first frequency domain resource is contiguous in frequency domain;
sending, by the network device, third information to the terminal device, wherein the third information indicates a correspondence between the first frequency domain resource and a second frequency domain resource, wherein the second frequency domain resource comprises a plurality of segments of contiguous frequency domain resources, and the first frequency domain resource is one segment of the plurality of segments of contiguous frequency domain resources; and
when a status of the terminal device is a first state, communicating, by the network device, with the terminal device on the second frequency domain resource, wherein the terminal device determines the second frequency domain resource for communicating with the network device based on the identifier of the first frequency domain resource indicated by the first information and the correspondence indicated by the third information.

6. The method according to claim 5, wherein when the status of the terminal device is a second state, the network device communicates with the terminal device on the first frequency domain resource.

7. The method according to claim 6, wherein at least one of the following is true:
the first state is a bandwidth part bundle active state; or
the second state is a bandwidth part active state.

8. The method according to claim 5, wherein the method further comprises:
sending, by the network device, second information to the terminal device, wherein the second information indicates the status of the terminal device.

9. A communications apparatus, wherein the communications apparatus comprises:
one or more processor; and
a non-transitory computer-readable storage medium coupled to the one or more processors and storing programming instructions for execution by the one or more processors, wherein the programming instructions instruct the one or more processors to:
receive first information, wherein the first information indicates an identifier of a first frequency domain resource, and wherein the first frequency domain resource is contiguous in frequency domain;
receive third information, wherein the third information indicates a correspondence between the first frequency domain resource and a second frequency domain resource, wherein the second frequency domain resource comprises a plurality of segments of contiguous frequency domain resources, and the first frequency domain resource is one segment of the plurality of segments of contiguous frequency domain resources; and
when a status of the communications apparatus is a first state:
determine, based on the identifier of the first frequency domain resource indicated by the first information and the correspondence indicated by the third information, the second frequency domain resource for communicating with a network device; and
communicate with the network device on the second frequency domain resource.

10. The communications apparatus according to claim 9, wherein the programming instructions further instruct the one or more processors to:
when the status of the communications apparatus is a second state, communicate with the network device on the first frequency domain resource.

11. The communications apparatus according to claim 10, wherein at least one of the following is true:
the first state is a bandwidth part bundle active state; or
the second state is a bandwidth part active state.

12. The communications apparatus according to claim 9, wherein the programming instructions further instruct the one or more processors to:
receive second information sent by the network device, wherein the second information indicates the status of the communications apparatus.

13. A communications apparatus, wherein the communications apparatus comprises:
one or more processor; and
a non-transitory computer-readable storage medium coupled to the one or more processors and storing programming instructions for execution by the one or more processors, wherein the programming instructions instruct the one or more processors to:
send first information to a terminal device, wherein the first information indicates an identifier of a first frequency domain resource, and wherein the first frequency domain resource is contiguous in frequency domain;
sending third information to the terminal device, wherein the third information indicates a correspondence between the first frequency domain resource and a second frequency domain resource, wherein the second frequency domain resource comprises a plurality of segments of contiguous frequency domain resources, and the first frequency domain resource is one segment of the plurality of segments of contiguous frequency domain resources; and
when a status of the terminal device is a first state, communicate with the terminal device on the second frequency domain resource, wherein the terminal device determines the second frequency domain resource for communicating with the communications apparatus based on the identifier of the first frequency domain resource indicated by the first information and the correspondence indicated by the third information.

14. The communications apparatus according to claim 13, wherein the programming instructions further instruct the one or more processors to:
when the status of the terminal device is a second state, communicate with the terminal device on the first frequency domain resource.

15. The communications apparatus according to claim 14, wherein at least one of the following is true:
the first state is a bandwidth part bundle active state; or
the second state is a bandwidth part active state.

16. The communications apparatus according to claim 13, wherein the programming instructions further instruct the one or more processors to:
send second information to the terminal device, wherein the second information indicates the status of the terminal device.

* * * * *